(12) United States Patent
Hicks, IIII et al.

(10) Patent No.: US 8,176,112 B2
(45) Date of Patent: May 8, 2012

(54) SYSTEMS, METHODS, AND PRODUCTS FOR MULTIMEDIA APPLICATIONS GATEWAYS

(75) Inventors: John A. Hicks, IIII, Roswell, GA (US);
Jason Savard, San Antonio, TX (US);
Gerald Ezrol, Herndon, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 379 days.

(21) Appl. No.: 12/122,825

(22) Filed: May 19, 2008

(65) Prior Publication Data
US 2009/0100492 A1    Apr. 16, 2009

Related U.S. Application Data

(60) Provisional application No. 60/998,692, filed on Oct. 12, 2007.

(51) Int. Cl.
*G06F 15/16* (2006.01)
(52) U.S. Cl. ........................................ 709/200
(58) Field of Classification Search .................. 709/225, 709/222, 219, 229, 235, 224, 200; 370/486, 370/466, 401, 414, 392, 389, 236, 235, 232, 370/230; 725/28, 27, 26, 25, 17, 12, 100
See application file for complete search history.

(56) References Cited

U.S. PATENT DOCUMENTS

| | | | |
|---|---|---|---|
| 5,086,385 A | 2/1992 | Launey | |
| 5,621,662 A | 4/1997 | Humphries | |
| 6,396,531 B1 | 5/2002 | Gerszberg | |
| 6,993,417 B2 | 1/2006 | Osann | |
| 7,187,986 B2 | 3/2007 | Johnson | |
| 2001/0034754 A1 | 10/2001 | Elwahab | |
| 2002/0112121 A1 | 8/2002 | Gerszberg | |
| 2002/0174444 A1 | 11/2002 | Gatto | |
| 2003/0056014 A1 | 3/2003 | Verberkt | |
| 2004/0054789 A1 | 3/2004 | Breh | |
| 2004/0203387 A1 | 10/2004 | Grannan | |
| 2005/0038326 A1 | 2/2005 | Mathur | |
| 2005/0147089 A1 | 7/2005 | Gerszberg | |
| 2005/0249196 A1 | 11/2005 | Ansari | |
| 2006/0015580 A1 * | 1/2006 | Gabriel et al. | 709/219 |
| 2006/0209857 A1 | 9/2006 | Hicks | |
| 2007/0192486 A1 * | 8/2007 | Wilson et al. | 709/225 |
| 2007/0248008 A1 * | 10/2007 | Etoh et al. | 370/230 |
| 2008/0052394 A1 * | 2/2008 | Bugenhagen et al. | 709/224 |

* cited by examiner

*Primary Examiner* — Asad Nawaz
*Assistant Examiner* — Charles Murphy
(74) *Attorney, Agent, or Firm* — Scott P. Zimmerman PLLC

(57) ABSTRACT

Methods, systems, and products are disclosed for a multimedia applications gateway. A home network management application is downloaded to the multimedia applications gateway operating in a home network. An anomaly that occurs in the home network is observed. An alert is sent to an external network controller, and the alert describes the anomaly in the home network. An instruction is received from the external network controller to remedy the anomaly.

15 Claims, 37 Drawing Sheets

Dual Mode Handset = GSM/UMTS Phone + Wi-Fi IMS SIP Phone

ADSL Installation in SFUs: POTS + HSIA
(ADSL over Telephone Wiring + HomePlug AV over Electrical Wiring + Wi-Fi)

ADSL Installation in SFUs: CVoIP + DBS/Homezone + HSIA (ADSL over Telephone Wiring + HPNAv3 over Coax + Wi-Fi)

VDSL Installation in SFUs: POTS + U-verse TV + HSIA (VDSL over Coax + HPNAv3 over Coax + Wi-Fi)

VDSL Installation in SFUs: CVoIP + U-verse TV + HSIA (VDSL over Cat5e Cable + HPNAv3 over Coax + Wi-Fi)

VDSL Installation in SFUs With iNID: CVoIP + U-verse TV + HSIA (HPNAv3 over Coax + Wi-Fi)

VDSL Installation in SFUs: CVoIP + U-verse TV + HSIA (Structured Wiring System with Cat5e Cabling for Voice, Data and Video)

ADSL Installation in MDUs: POTS + HSIA (ADSL over Telephone Wiring + HomePlug AV over Electrical Wiring + Wi-Fi)

ADSL Installation in MDUs: CVoIP + DBS/Homezone + HSIA (ADSL over Telephone Wiring + HPNAv3 over Coax + Wi-Fi)

VDSL Installation in MDUs: CVoIP + U-verse TV + HSIA (VDSL over Telephone Wiring + HPNAv3 over Coax + Wi-Fi)

VDSL Installation in MDUs: POTS + U-verse TV + HSIA (VDSL over Telephone Wiring + HPNAv3 over Telephone Wiring + Wi-Fi)

SYSTEMS, METHODS, AND PRODUCTS FOR MULTIMEDIA APPLICATIONS GATEWAYS

CROSS-REFERENCE TO RELATED APPLICATIONS

This application claims the benefit of U.S. Provisional Application 60/998,692, filed Oct. 12, 2007, which is incorporated herein by reference in its entirety.

BACKGROUND

Exemplary embodiments generally relate to communications, to computers and data processing, to television, and to interactive video distribution systems and, more particularly, to path finding or routing, to access to network resources, to multiple network interconnecting, to energy consumption, and to video distribution system components.

A multimedia applications gateway provides an interface between home networks and external networks. The multimedia applications gateway allows home networks and devices to interface with a cable network, a telephone network, an electrical supply or grid network, a security network, or any other network. Whenever access is needed to any network, the multimedia applications gateway acts as a single point of connection and brokers that access. Conventional multimedia applications gateways, however, are too complex for deployment to the general public—their advantages are outweighed by installation and configuration difficulties.

SUMMARY

Exemplary embodiments provide methods, systems, and products for a multimedia applications gateway. The multimedia applications gateway includes the functionality of a multimedia applications gateway, and the multimedia applications gateway will be deployed to millions of homes across the world, thus becoming the cornerstone of residential networks. Exemplary embodiments differ from conventional designs, however, in that the multimedia applications gateway is simple to install and to maintain. Exemplary embodiments differ from conventional designs, however, in that the multimedia applications gateway enables a service provider to remotely manage and administer a user's network. The multimedia applications gateway of the exemplary embodiments may download applications from the network and remotely monitor and diagnose the network. Exemplary embodiments thus proactively monitor the performance of all elements in the network. When an anomaly occurs in the network, the multimedia applications gateway may send an alert to an external system (such as a service provider's network controller in the service provider's network operations center). The alert may describe the anomaly in the user's network, and the service provider may then analyze the alert and determine a corrective action. The service provider may then send an instruction to the multimedia applications gateway, and the instruction may provide commands or information that help remedy the anomaly. Because the multimedia applications gateway may be remotely monitored by the service provider's network operations center, the service provider can help resolve issues in a residential customer's home network. In other situations the multimedia applications gateway may detect device failure or error in the user's network. The multimedia applications gateway may disable a port so that the failure does not adversely impact the overall performance of the network. Moreover, the multimedia applications gateway may continuously monitor service availability and alert the service provider to degradations in service. The multimedia applications gateway may assist a service provider in quickly identifying and isolating an anomaly and in determining the location of the anomaly, for example, in the home network, access network, or backbone network.

More exemplary embodiments include a system describing a multimedia applications gateway. A home network management application is downloaded to the multimedia applications gateway operating in a home network. When an anomaly occurs in the home network, an alert is sent to an external network controller. The alert describes the anomaly in the home network. A service provider's network operations center may then send an instruction to the multimedia applications gateway, and the instruction may provide commands or information that help remedy the anomaly. Because the multimedia applications gateway may be remotely monitored by the service provider's network operations center, the service provider can help resolve issues in the residential customer's home network.

Other exemplary embodiments describe a computer program product. A home network management application is downloaded to the multimedia applications gateway operating in a home network. When an anomaly occurs in the home network, an alert is sent to an external network controller. The alert describes the anomaly in the home network. A service provider's network operations center may then send an instruction to the multimedia applications gateway, and the instruction may provide commands or information that help remedy the anomaly. Because the multimedia applications gateway may be remotely monitored by the service provider's network operations center, the service provider can help resolve issues in the residential customer's home network.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a" "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
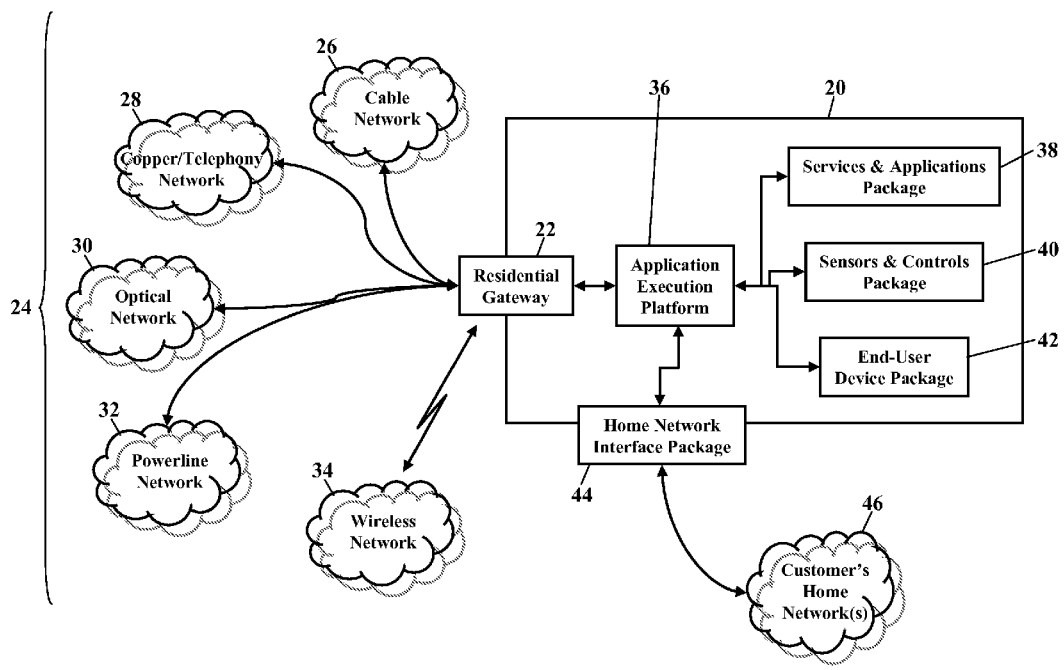
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a multimedia applications gateway 20 communicating with, or connected to, a residential gateway 22. The residential gateway 22 acts as an interface to one or more access networks 24. That is, the residential gateway 22 may have access interface technology to one or more wide area networks and/or one or more local area networks. The residential gateway 22, for example, may have a connection to a cable network 26, another connection to a copper or telephony network 28, a third connection to an optical network 30, and a fourth connection to a power line network 32, in which signals are communicated via electrical wiring. The residential gateway 22 may even wirelessly interface or communicate with a wireless network 34. The residential gateway 22 may have a physical connection or wireless coupling to any type of network, regardless of the networking environment. Exemplary embodiments, for example, may be applied to any network operating in the radio-frequency domain and/or the Internet Protocol (IP) domain. Exemplary embodiments may also be applied to any distributed computing network, such as the Internet (sometimes alternatively known as the "World Wide Web"), an intranet, a local-area network (LAN), and/or a wide-area network (WAN). The residential gateway 22 may interface with coaxial cables, copper wires, fiber optic lines, and/or hybrid-coaxial lines. The residential gateway 22 may wirelessly interface with any portion of the electromagnetic spectrum and any signaling standard (such as the I.E.E.E. 802 family of standards, GSM/CDMA/TDMA or any cellular standard, and/or the ISM band). Exemplary embodiments may be applied to any wireless/wireline communications network, regardless of physical componentry, physical configuration, or communications standard(s). Because the multimedia applications gateway 20 may have a continuous broadband connection to any of the access networks 24, a network and/or service provider may depend on the multimedia applications gateway 20 to alert the provider to service degradations or interruptions.

As FIG. 1 illustrates, the multimedia applications gateway 20 may include several physical and/or logical components. The residential gateway 22, for example, funnels or sends data to an application execution platform 36. The application execution platform 36 provides physical or software interfaces to many devices and applications, depending on the configuration. The application execution platform 36, for example, may interface with a services and applications package 38. As later paragraphs will explain, the services and applications package 38 functions as an in-home application execution platform for entertainment options, customer care features, medical services, security services, and home monitoring applications. The services and applications package 38 may also provide installation and repair routines and manuals, voice over Internet Protocol ("VoIP") call processing, and remote monitoring and administration capabilities. The services and applications package 38 may also provide Digital Living Networking Alliance features and gateway functions. Later paragraphs describe the services and applications package 38 in greater detail.

The application execution platform 36 may also interface with a sensors and controls package 40. The sensors and controls package 40 includes physical or software interfaces (such as drivers and/or configuration parameters) to security and convenience features. The sensors and controls package 40, for example, allows the application execution platform 36 to receive and to process security data from security sensors, such as motion detectors, $CO_2$ or smoke detectors, temperature sensors, and window and door contacts. These security sensors allow the application execution platform 36 to execute an action when a security situation occurs. The sensors and controls package 40, however, also offers convenience and home automation features. The application execution platform 36, for example, may receive and process mechanical and electrical data from thermostats, pressure sensors, light switches and sensors, voltage and current sensors, and other data. Later paragraphs describe the sensors and controls package 40 in greater detail.

The application execution platform 36 may also interface with a device package 42. The device package 42 includes physical or software interfaces to the customer's or end user's devices. The application execution platform 36, for example, may include configuration settings and/or software drivers that allow data to be sent to, and received from, the customer's television(s) and/or set-top box(es), corded/cordless phone(s), cellular phone(s), camera(s), printer(s), computer(s), and any other device that the device package 42 is configured to support. Later paragraphs describe the device package 42 in greater detail.

The application execution platform 36 may also interface with a home network interface package 44. The home network interface package 44 includes physical and/or software interfaces to a residential customer's home network(s) 46. The home network interface package 44, for example, may include configuration settings and/or software drivers that allow data to be sent to, and received from, coaxial cabling, twisted copper wiring, or even CAT cabling installed in the customer's residence. The home network interface package 44 may also support powerline networking that sends and receives data over the residence's electrical wiring. The home network interface package 44 may also support a home wireless network that uses BLUETOOTH®, WI-FI®, or any other signaling standard or frequency (such as the Industrial, Scientific, and Medical band). Again, because the multimedia applications gateway 20 may have a continuous broadband connection to any of the access networks 24, a network and/or service provider may depend on the multimedia applications gateway 20 to alert the provider to service degradations or interruptions in the residential customer's home network 46. Here, then, the application execution platform 36 and/or the home network interface package 44 may proactively monitor the home network 46. Moreover, the application execution platform 36 allows the network and/or service provider to maintain only a single interface to the customer's home network 46, rather than maintaining interfaces to all the devices connected to the customer's home network 46.

The residential gateway 22 may be configured with, or separate from, the multimedia applications gateway 20. The access interface technology of the residential gateway 22, for example, may be incorporated into the multimedia applications gateway 20. The multimedia applications gateway 20, for example, may be a cable or DSL modem combined with router functionality. The multimedia applications gateway 20, in fact, may also additionally or alternatively include access interface technology to any network (such as the access networks 24). The residential gateway 22, however, may be a separate component from the multimedia applications gateway 20.

Figure 2:
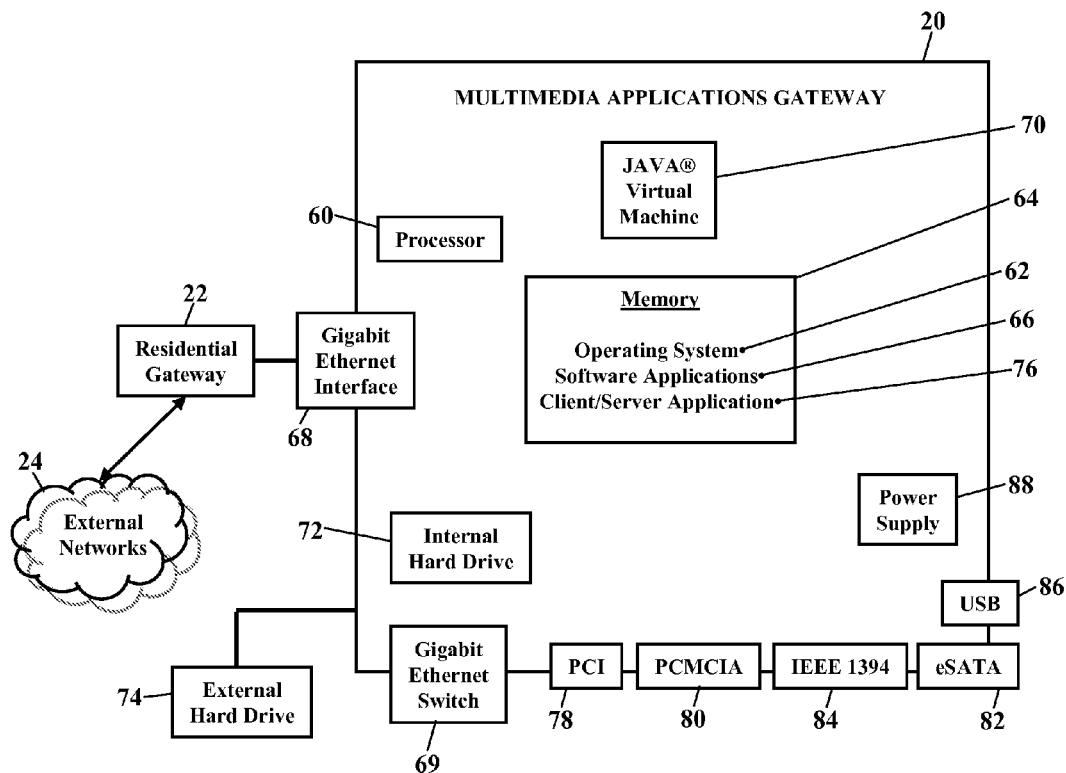
FIG. 2 is a block diagram that further illustrates a multimedia applications gateway, according to more exemplary embodiments.

FIG. 2 is a block diagram that further illustrates the multimedia applications gateway 20, according to more exemplary embodiments. FIG. 2 illustrates some of the components of the multimedia applications gateway 20 and some of its physical connections. The multimedia applications gateway 20 may comprise a processor 60 (e.g., "µP"), application specific integrated circuit (ASIC), or other device that executes an operating system 62 stored in a memory 64. The multimedia applications gateway 20 may also store and execute various software applications 66 that are also stored in the memory 64. The multimedia applications gateway 20 may include an interface 68 to the residential gateway 22. Although the interface 68 may be of any type, the interface 68 is illustrated as a Gigabit Ethernet interface. A Gigabit Ethernet Switch 69 may also be included.

The multimedia applications gateway 20 may also include, or function as, a Java Virtual Machine 70. The JAVA® Virtual Machine 70 may include an Open Services Gateway initiative ("OSGi") framework that is configured to execute one or more OSGi JAVA® applications. The OSGi JAVA® applications may be downloaded and stored in the memory 64 for execution by the processor 60. As those of ordinary skill in the art understand, JAVA® is a computer language that may be compiled into a device- or machine-neutral format. Any processor, platform, or device running the JAVA® system (i.e., the JAVA® Virtual Machine 70) may execute JAVA® applications. Similarly, the Open Services Gateway initiative is an alliance that specifies JAVA®-based platforms that may be remotely managed. Because JAVA® and OSGi are both well-known to those of ordinary skill in the art, no further discussion is needed.

The multimedia applications gateway 20 may also include additional components. The multimedia applications gateway 20, for example, may include an internal 72 and/or an external 74 hard drive. The hard drives 72 and 74 allow the application execution platform 36 to store the customer's data (such as movies, music, pictures, and documents). The multimedia applications gateway 20 may also store and locally execute a client/server applications, such as media server, home monitoring, IP PBX, pc backup, and function as application server. As those of ordinary skill in the art understand, the Dynamic Host Configuration Protocol (DHCP) is a protocol that is used by networked devices (e.g., clients) to obtain parameters necessary to operate in an Internet Protocol (IP) network. Because the DHCP protocol is well-known, no further explanation is needed. The multimedia applications gateway 20 may also include one or more PCI slots 78 and PCMCIA card slots 80 for plugging in optional interfaces or devices. The multimedia applications gateway 20 may also include one or more eSATA ports 82, IEEE 1394 ports 84, and/or USB ports 86 for attaching optional devices, such as additional drives, storage, cameras, and other devices peripherals. The multimedia applications gateway 20 may also include a power supply 88, such as AC power, AD/DC converter, and/or battery backup.

Figure 3:
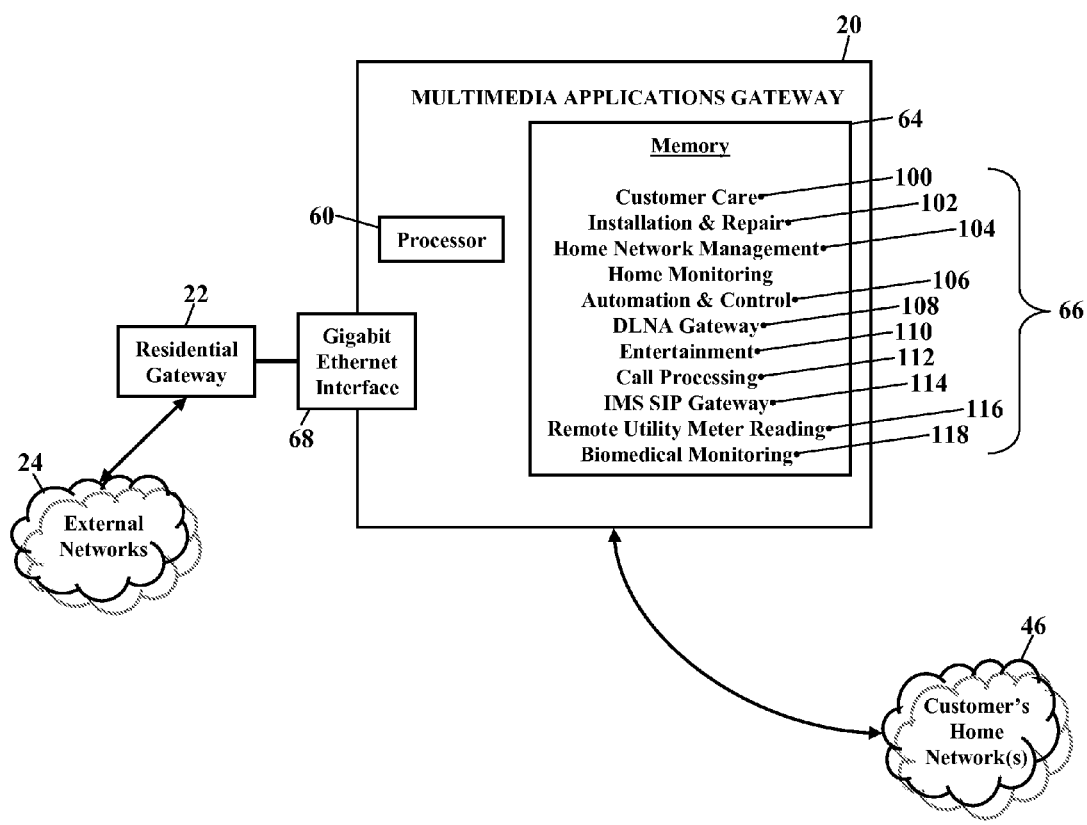
FIG. 3 is a schematic illustrating software applications stored in the memory of the multimedia applications gateway, according to more exemplary embodiments.

FIG. 3 is a schematic illustrating the software applications 66 stored in the memory 64 of the multimedia applications gateway 20, according to more exemplary embodiments. The software applications 66 may be OSGi, JAVA® applications, open system software applications (such as LINUX® applications), custom software, or ASIC products. Regardless, the software applications 66 provide services and features that make the multimedia applications gateway 20 easy to install and maintain. A customer care application 100, for example, may monitor a service layer in real-time and detect threshold alerts. The customer care application 100 may also provide diagnostic routines that help resolve alerts and errors. The customer care application 100 may also provide or enhance testing and/or correlation capabilities for trouble isolation and resolution, such as determining if an anomaly has occurred in the home network, access network, or backbone network.

The software applications 66 may also include an installation and repair application 102. The installation and repair application 102 may provide capabilities to test and diagnose the "whole home" environment, perhaps using TR-069 compliant devices and/or interfaces. As those of ordinary skill in the art understand, the Technical Report 069 is a DSL Forum technical specification that defines an application layer protocol for remote management of end-user devices. Because TR-069 is well-known, no further explanation is needed. The installation and repair application 102 may install and auto-configure any devices connected to the multimedia applications gateway 20 or any devices communicating with the multimedia applications gateway 20 via the customer's home network 46. The installation and repair application 102 may provide print-server functionality, as well as a file and print sharing software wizard.

The software applications 66 may also include a home network management application 104. The home network management application 104 may provide performance monitoring and reporting services for any devices connected to the multimedia applications gateway 20 or any devices communicating with the multimedia applications gateway 20 via the customer's home network 46. The home network management application 104 may provide performance monitoring and reporting services for the customer's home network 46, such as integration with an Internet Protocol Assurance and Analysis of Connections ("IPAAC") application that provides for diagnostic access. The home network management application 104, for example, may detect and alert of packet delay or clogging that occurs in the customer's home network 46. Whatever anomaly or error is detected, the home network management application 104 may also provide remote management and administration services for the multimedia applications gateway 20 and/or the customer's home network 46.

The software applications 66 may also include a home monitoring, automation and control application 106. The home monitoring, automation and control application 106 may provide security monitoring services, convenience features, and automated control of systems and devices in the home environment. Later paragraphs discuss the home monitoring, automation and control application 106 in greater detail.

The software applications 66 may also include a Digital Living Network Alliance ("DLNA") gateway application 108. The DLNA gateway application 108 provides DLNA and gateway functions for Internet Protocol and Internet Protocol television ("IPTV") video services. The DLNA gateway application 108 may also terminate any proprietary digital rights management data streams and convert the data streams to an Open Standards Link Protection Protocol. The DLNA gateway application 108 may also interface with a DLNA media player, such as a DLNA-complaint television, set-top box, cell phone, computer, personal digital assistant, and/or any other device. As those of ordinary skill in the art understand, the Digital Living Network Alliance is an industry collaboration to create DLNA Certified products that can work together—no matter the brand. DLNA Certified devices connect, discover, and communicate with each other over the home network 46. Because the DLNA collaboration is well-known, no further explanation is necessary.

The software applications 66 may also include an entertainment application 110. The entertainment application 110 provides entertainment services, such as video recorder functions for the customer's entire home network 46. The entertainment application 110 may also locally access advertisements, banners, and any other content and insert that content into video and music streams processed by the application execution platform 36. The entertainment application 110 facilitates downloading and storage of the customer's data, such as movies, music, pictures, and documents. If the customer does not own a right in the data, the entertainment application 110 may also make the data available according to a rental or usage policy. The entertainment application 110 may also control access to locally-cached/stored content that has been pre-positioned, such as "top ten" movies and music.

The software applications 66 may also provide other services and features. A call processing application 112, for example, may provide, establish, or configure a virtual in-home IP-based PBX that enhances the customer's Voice-over Internet Protocol service. An IP Multimedia Subsystem ("IMS") Session Initiation Protocol ("SIP") gateway application 114 functions as a service enabler for converged services. As those of ordinary skill in the art understand, the IMS is an architectural framework for delivering Internet Protocol (IP) multimedia to mobile users. As those of ordinary skill in the art also understand, SIP is an application-layer control (signaling) protocol for creating, modifying, and terminating sessions with one or more participants. SIP can be used to create two-party, multiparty, or multicast sessions that include Internet telephone calls, multimedia distribution, and multimedia conferences. Because both IMS and SIP are well-known, no further explanation is necessary.

A remote utility meter application 116 allows smart meters to read and remotely report electricity, gas, water, and other utility readings and consumption. The remote utility meter application 116 may also report telemetry information, if available. When biomedical data is available from biomedical sensors, a biomedical monitoring application 118 may report blood pressure, glucose readings, EKG readings, location data, and any other biomedical information obtained from biomedical sensors.

Figure 4:
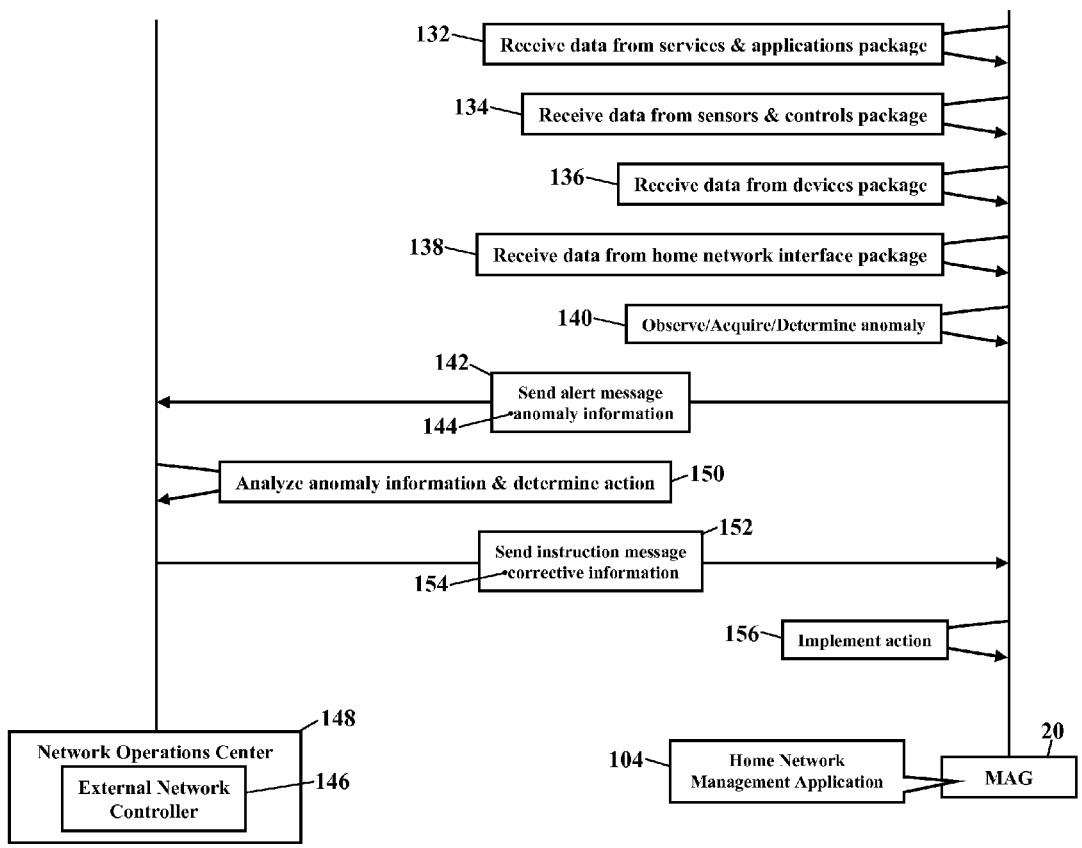
FIG. 4 is a schematic illustrating a process for remote monitoring of the multimedia applications gateway, according to more exemplary embodiments.

FIG. 4 is a schematic illustrating a process for remote monitoring of the multimedia applications gateway 20, according to more exemplary embodiments. The multimedia applications gateway ("MAG") 20 may store and execute the home network management application 104. The home network management application 104 may be downloaded and stored in the multimedia applications gateway 20. The home network management application 104 may be an OSGi JAVA® application, open system application (such as LINUX®), a custom software application, or ASIC product. Regardless, the home network management application 104 may receive data regarding any component or application from the services and applications package 38 (Block 132). The home network management application 104 may also receive data from the sensors and controls package 40 (Block 134), the device package 42 (Block 136), and/or the home network interface package 44 (Block 138). The home network management application 104, in other words, may receive any data or information detected by or processed by any component, device, or application accessible to the multimedia applications gateway 20.

The home network management application 104 may report anomalies. The terms "anomaly" and "anomalies" include any information, errors, and conditions. An anomaly, for example, may be any information that is outside or beyond predefined limits, that exceeds a threshold value, or that is less than a minimum value. An anomaly may also be any error code or statement that is reported by a device, system, or application. The home network management application 104, in other words, determines, acquires, or observes any information processed by any component, device, or application that is accessible to the multimedia applications gateway 20.

When an anomaly is observed or acquired (Block 140), the home network management application 104 reports the anomaly. The home network management application 104 causes the processor 60 to send an alert message (Block 142). The alert message contains anomaly information 144 that describes the anomaly. The alert message is sent or routed to any destination desired for receiving alerts. FIG. 4, for example, illustrates an external network controller 146. In this example the external network controller 146 is a server or other device that operates within in, or is affiliated with, a network operations center 148. The network operations center 148 is a computer or facility that manages a network provider's network. The network operations center 148, however, may be affiliated with a particular network provider, such as a cable network provider, a digital subscriber line provider, or an optical network provider. If, for example, the home network management application 104 is associated with a cable network provider, then the alert message is routed to a communications address (such as an IP address) associated with the cable network provider's operations center. If, however, the home network management application 104 is associated with a digital subscriber line provider, then the alert message is routed to a different communications address that is associated with the digital subscriber line provider's operations center.

Corrective action may then be implemented. When the alert message is received at the network provider's external network controller 146, the network operations center 148 may analyze the anomaly information 144 and determine an action (Block 150). The network operations center 148 may then send an instruction message to the multimedia applications gateway 20 (Block 152). FIG. 4 illustrates the instruction message originating from the external network controller 146, but the instruction message may originate from some other server or device. Regardless, the instruction message comprises corrective information 154 that helps resolve or ameliorate the anomaly. When the multimedia applications gateway 20 receives the instruction message, the home network management application 104 retrieves or obtains the corrective information 154 and implements an action (Block 156).

Figure 5:
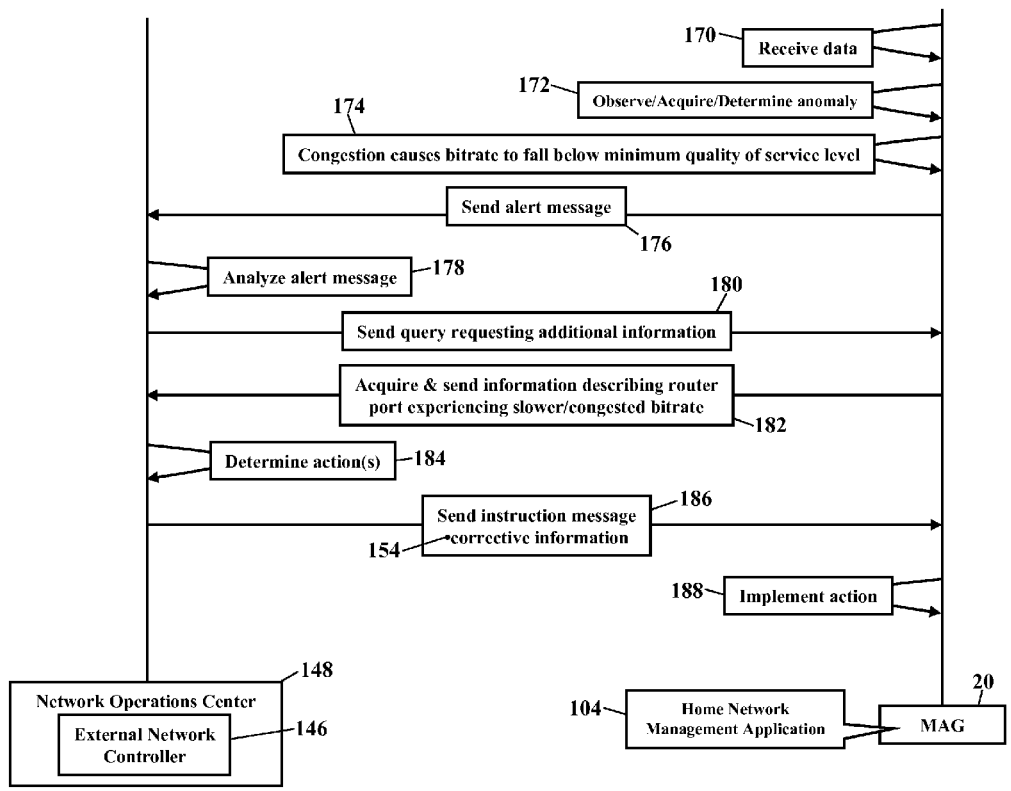
FIGS. 5 and 6 are more schematics illustrating another process for remote monitoring of the multimedia applications gateway, according to still more exemplary embodiments.
Figure 6:
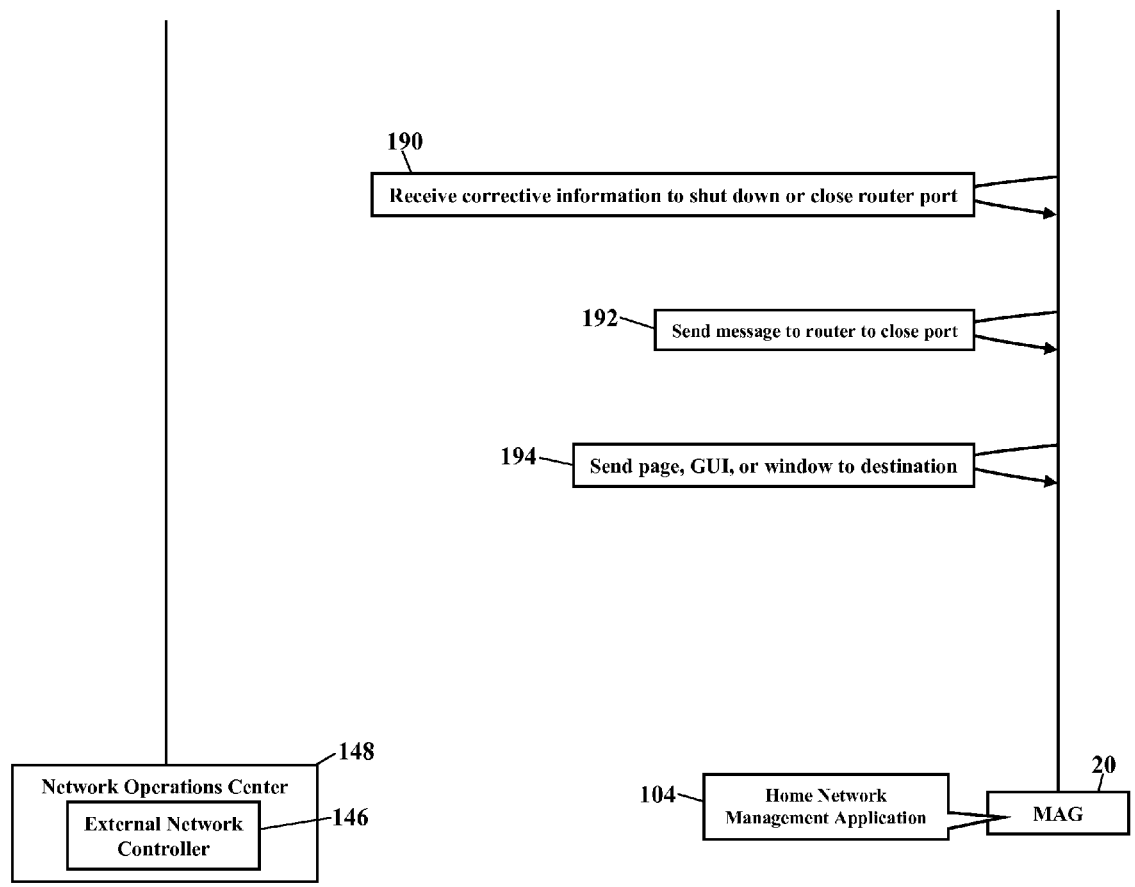

FIGS. 5 and 6 are more schematics illustrating another process for remote monitoring of the multimedia applications gateway 20, according to still more exemplary embodiments. The multimedia applications gateway 20 may again store and execute the home network management application 104. The home network management application 104 receives data (Block 170) and determines that an anomaly exists (Block 172). In this example the anomaly is a packet bottleneck in the customer's home network (illustrated as reference numeral 46 in FIG. 1). That is, the customer's residential home network 46 is experiencing congestion or clogging of data packets, causing a network or path bitrate to fall below a minimum quality of service level, due to a failure of a device operating on the home network (Block 174). Suppose, for example, that a network provider strives to provide a download bandwidth or bitrate of a minimum 10 Mbits/second. If the customer's home network 46 is experiencing congestion, this bottleneck will prevent the service provider from meeting their quality of service guarantee. Even though the root cause of the bottleneck lies within the customer's home network 46, the home network management application 104 provides advance notice to the service provider, and sends the alert message to the external network controller 146 (Block 176).

Here, then, the service provider may take corrective action. The network operations center 148 analyzes the alert message (e.g., describing the customer's congested home network 46) (Block 178). The network operations center 148 may send a query that requests additional information describing the anomaly (Block 180). When the home network management application 104 receives the query, the home network management application 104 acquires the requested, additional information describing the anomaly. In this example, the additional information may describe a router port that is experiencing the slower, congested bitrate. The home network management application 104 sends the port information (Block 182). The network operations center 148 analyzes the congestion/port information and determines an action (Block 184). The instruction message is sent (Block 186), and the instruction message includes the corrective information 154 that helps resolve or ameliorate the anomaly. The home network management application 104 receives the instruction message and may implement the action (Block 188).

The process continues with FIG. 6. The corrective information 154, for example, may instruct the multimedia applications gateway 20 to "shut down" the "slow" or congested port on a router (Block 190). Because the multimedia applications gateway 20 may communicate with the router, the home network management application 104 sends a message to the router (Block 192). The message instructs the router to close or disable the offending port. The home network management application 104 may then cause a web page, graphical user interface, or "pop up" window to be sent to a destination device (such as the customer's computer, phone, or music player) (Block 194). The web page, GUI, or "pop up" window may be displayed or presented to assist the customer in identifying and resolving the anomaly (e.g., the bandwidth bottleneck).

Figure 7:
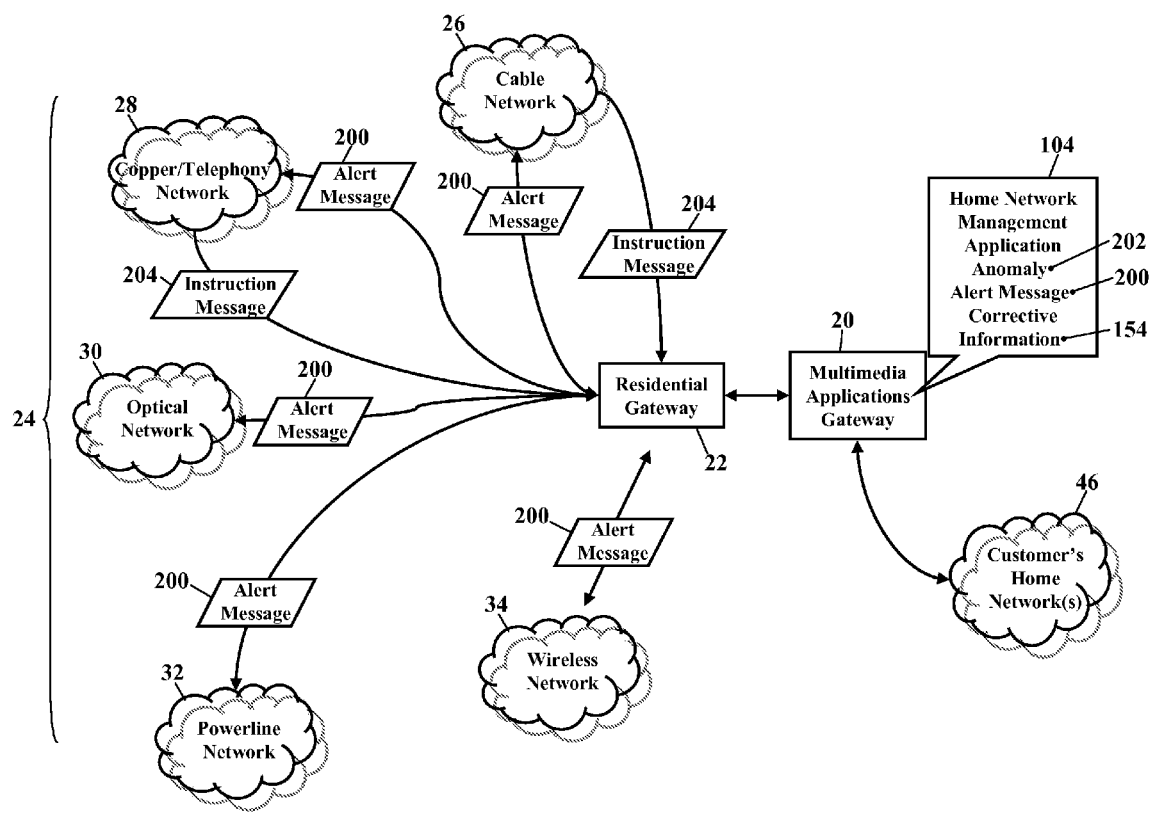
FIG. 7 is a schematic illustrating another method for remote monitoring of the application execution platform 36, according to still more exemplary embodiments.

FIG. 7 is a schematic illustrating another method for remote monitoring of the multimedia applications gateway 20, according to still more exemplary embodiments. Here the home network management application 104 sends multiple copies of each alert message 200. When an anomaly 202 is observed, the home network management application 104 sends the alert message 200 to the designated destination (e.g., the external network controller 146 in FIGS. 5 and 6). Here, though, the home network management application 104 is provider neutral. That is, the home network management application 104 is not associated with one particular network provider. The home network management application 104, instead, equally treats all networks and network providers. Here, then, the alert message 200 is copied and sent some destination associated with each external network 24 and/or each network provider. Each network available to, or communicating with, the residential gateway 22 and/or the application execution platform 36 receives a copy of the alert message 200. The home network management application 104, for example, creates multiple copies of the alert message 200 and sends at least one copy to the provider of the cable network 26, another copy to the provider of the copper or telephony network 28, another copy to the provider of the optical network 30, another copy to the provider of the power line network 32, and another copy to the provider of the wireless network 34. The home network management application 104 thus determines or counts the number of different networks and/or providers to which it has access. The home network management application 104 then sends a copy of the alert message 200 to each different network and/or provider. Each copy of the alert message 200 may be generically formatted, or each copy may be uniquely formatted for each different network and/or provider. Each copy is routed to a communications address (such as an IP address) associated with each provider's external network controller and/or each provider's network operations center (shown, respectively, as reference numerals 146 and 148 in FIGS. 5 and 6). Should the home network management application 104 then receive multiple instruction messages 204 (such as an instruction message from each network provider's operations center), then the home network management application 104 may recommend or even implement the corrective information 154 received by each instruction message 204. As FIGS. 5 and 6 also explained, a web page, GUI, or "pop up" window may display each provider's suggested corrective information 154, thus allowing the customer to have multiple options for resolving the anomaly.

Figure 8:
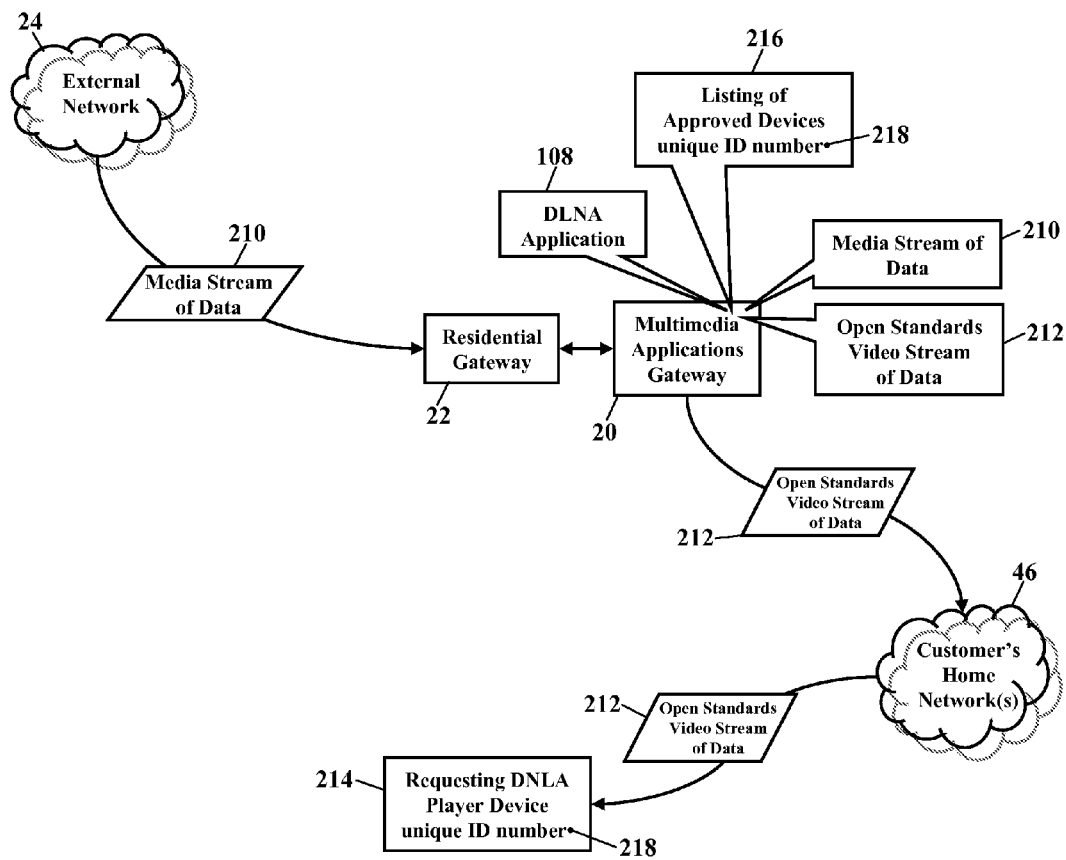
FIG. 8 is a schematic illustrating a DLNA gateway application, according to even more exemplary embodiments.

FIG. 8 is a schematic illustrating the DLNA gateway application 108, according to even more exemplary embodiments. As those of ordinary skill in the art understand, the Digital Living Network Alliance is an industry collaboration to create DLNA Certified products that can work together—no matter the brand. Because the DLNA collaboration is well-known, no further explanation is necessary. The DLNA gateway application 108 performs, or arranges, a conversion of proprietary media streams into an open standards protocol. As FIG. 8 illustrates, the multimedia applications gateway 20 requests and receives a media stream 210 of data. The media stream 210 of data may comprise an Internet Protocol television session, yet the media stream 210 of data may comprise any video, music, photos, and/or any other data. The media stream 210 of data may or may not terminate at the multimedia applications gateway 20. When, for example, the media stream 210 of data terminates at the multimedia applications gateway 20, the DLNA gateway application 108 stores the media stream 210 of data to the local memory (illustrated as reference numeral 64 in FIG. 2). If the media stream 210 of data comprises proprietary content (such as digitally protected, watermarked, encrypted, or copyrighted content), the DLNA gateway application 108 may convert the proprietary media stream 210 of data to an open standards link protection protocol. When the multimedia applications gateway 20 receives a request for the proprietary media stream 210 of data, the multimedia applications gateway 20, instead, retrieves the open standards version. That is, the multimedia applications gateway 20 retrieves an open standards video stream 212 of data and sends the open standards video stream 212 of data to a requesting DNLA player device 214.

The requesting device 214, of course, may need to conform to the DLNA requirements. The multimedia applications gateway 20, therefore, may access a listing 216 of approved devices. The listing 216 of approved devices is illustrated as being locally stored in the multimedia applications gateway 20, but the listing 216 of approved devices may be remotely accessible via the external network 24. The listing 216 of approved devices comprises a list of the customer's approved or registered devices that comply with digital living network alliance requirements or standards. The listing 216 of approved devices, in particular, stores a unique identification number 218 for each of the customer's approved or registered devices. The unique identification number 218 may be any alphanumeric combination that uniquely identifies a customer's device. The unique identification number 218, for example, may be a device serial number or a processor serial number. The unique identification number 218 may be assigned by the manufacturer of the device or by the customer. The unique identification number 218, however, may only be unique to the customer, such that all the customer's devices share the same identification number. Regardless, the requesting device 214 includes the unique identification number 218 when requesting the proprietary media stream 210 of data.

According to exemplary embodiments, when the multimedia applications gateway 20 receives the request, the DLNA gateway application 108 ensures conformance. The DLNA gateway application 108 compares the device's unique identification number 218 to the listing 216 of approved devices. When the device's unique identification number 218 is found in the listing 216 of approved devices, then the multimedia applications gateway 20 retrieves the converted, open standards version video stream 212 of data from the memory 64. The multimedia applications gateway 20 sends the open standards video stream 212 of data to the requesting device 214. When, however, the requesting device's unique identification number 218 is not found in the listing 216 of approved devices, then the DLNA gateway application 108 may cause the multimedia applications gateway 20 to deny the request. Simply put, if the customer complies with the DLNA requirements or standards, then the multimedia applications gateway 20 may act as a central repository for all proprietary content. Intellectual property holders are thus assured that the customer is free to share proprietary content amongst the customer's registered devices.

Figure 9:
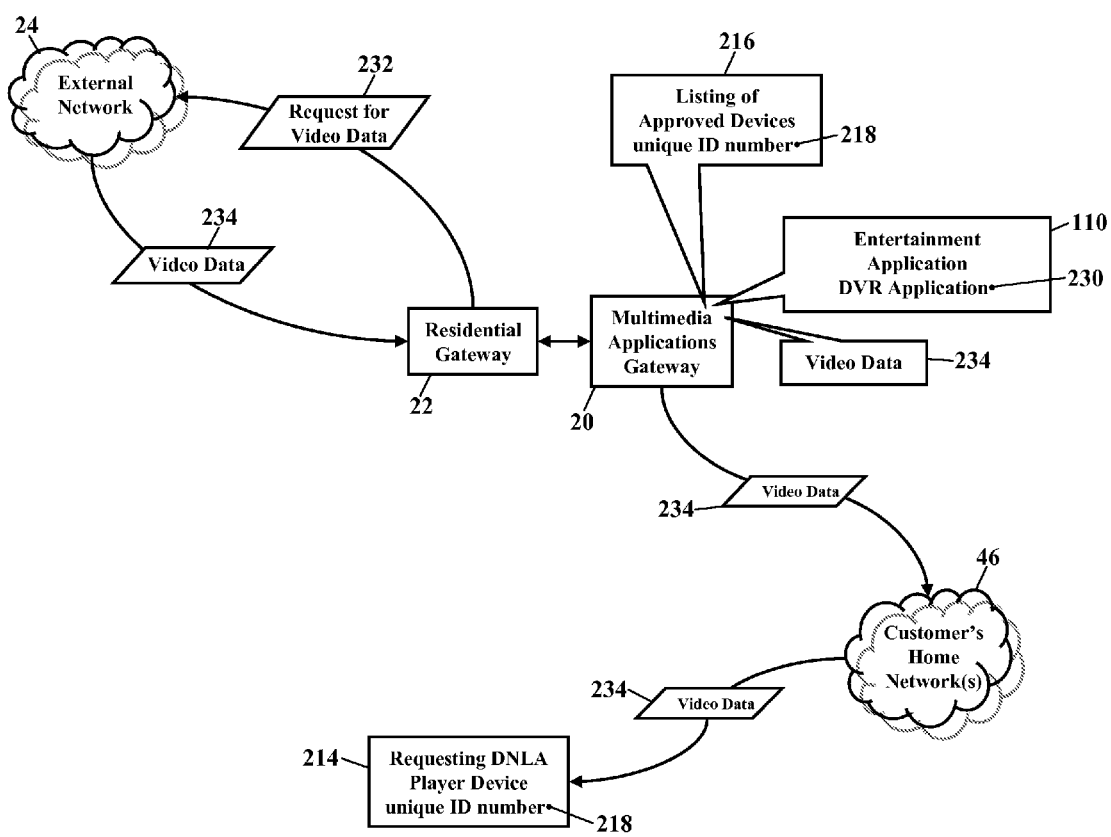
FIG. 9 is a schematic illustrating some of the entertainment features of the multimedia applications gateway, according to even more exemplary embodiments.

FIG. 9 is a schematic illustrating some of the entertainment features of the multimedia applications gateway 20, according to even more exemplary embodiments. As the paragraphs accompanying FIG. 3 explained, the multimedia applications gateway 20 may store and execute the entertainment application 110. The entertainment application 110 provides entertainment services, such as video recorder functions for the customer's entire home network 46. As FIG. 9 illustrates, the entertainment application 110 may include a digital video recorder ("DVR") application 230. The digital video recorder application 230 may be a software module or component of the entertainment application 110. The digital video recorder application 230 may be downloaded and stored in the local memory (illustrated as reference numeral 64 in FIG. 2) of the application execution platform 36. When video is desired (perhaps by the requesting device 214 in the customer's home network 46), the digital video recorder application 230 causes the processor (illustrated as reference numeral 60 in FIG. 2) to issue a request 232 for video data. The request 232 for video data is sent to the appropriate destination along any of the external networks 24 to which the residential gateway 22 may communicate. In response, the multimedia applications gateway 20 receives video data 234. The video data 234 may be a file or a stream of video data. The video data 234, for example, may be an MPEG file or an MPEG video stream. The digital video recorder application 230 may configure the local memory 64 (or the internal hard drive 72 or the external hard drive 74 illustrated in FIG. 2) to store the video data 234. If access to the video data 234 is restricted (such as by copyright restrictions or time/date access restrictions), the digital video recorder application 230 may manage permissible access to the video data 234. The digital video recorder application 230, for example, may use the listing 216 of approved devices to determine what devices may permissibly access the stored video data 234.

Figure 10:
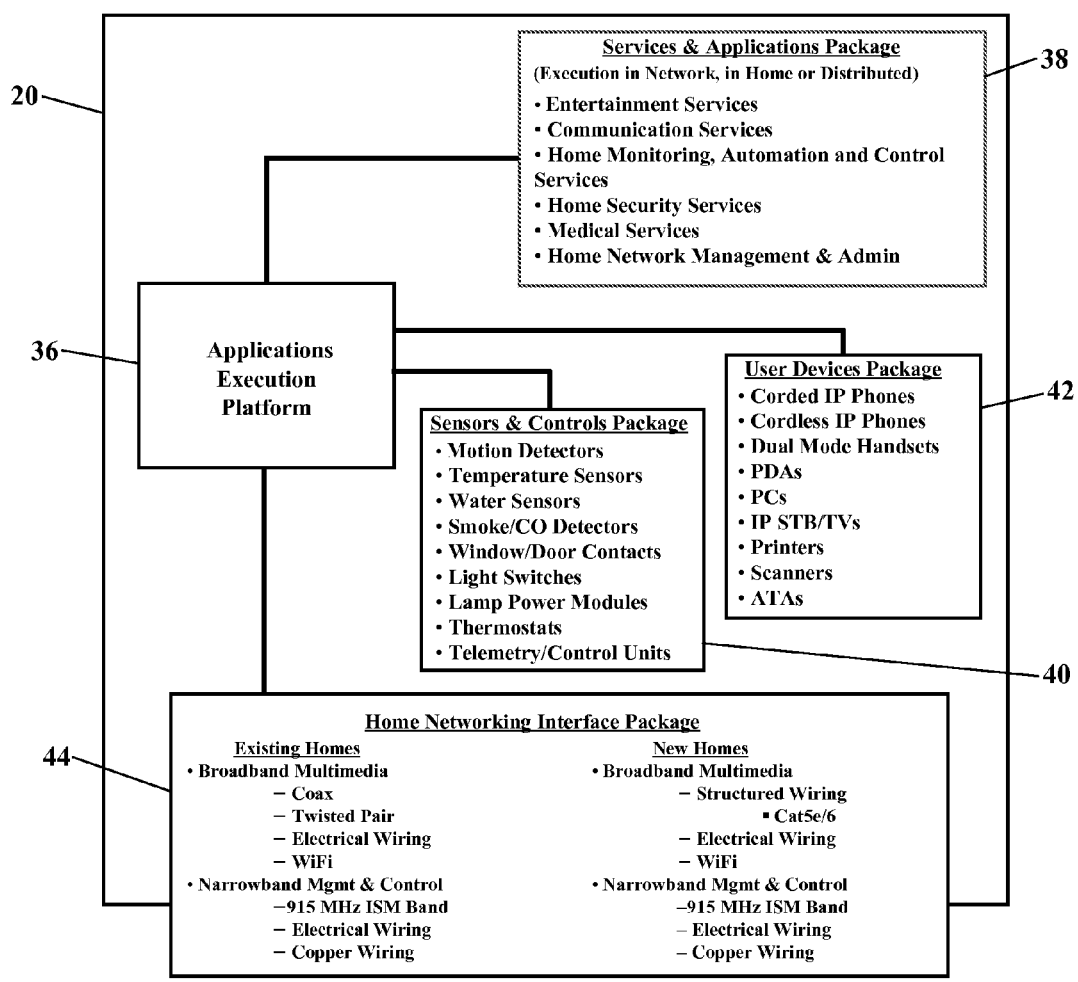
FIG. 10 is a schematic further illustrating the multimedia applications gateway, according to even more exemplary embodiments.

FIG. 10 is a schematic further illustrating the multimedia applications gateway 20, according to even more exemplary embodiments. FIG. 10 illustrates more physical and software componentry of the services and applications package 38, the sensors and controls package 40, the device package 42, and the home network interface package 44. The services and applications package 38 may support network-based, home-based, or distributed applications for entertainment options, customer care features, medical services, security services, and home monitoring applications. The sensors and controls package 40 includes physical or software interfaces for receiving data from motion detectors, $CO_2$ or smoke detectors, temperature sensors, and window and door contacts. The sensors and controls package 40 may also receive data from home automation and convenience components, such as light switches and sensors, thermostats, voltage and current sensors, and other data. The devices package 42 includes physical or software interfaces to the customer's or end user's devices, such as the customer's television(s) and/or set-top box(es), corded/cordless phone(s), cellular phone(s), camera(s), printer(s), computer(s), and any other device that the device package 42 is configured to support. The home network interface package 44 includes physical and/or software interfaces to the residential customer's home network(s) 34.

Figure 11:
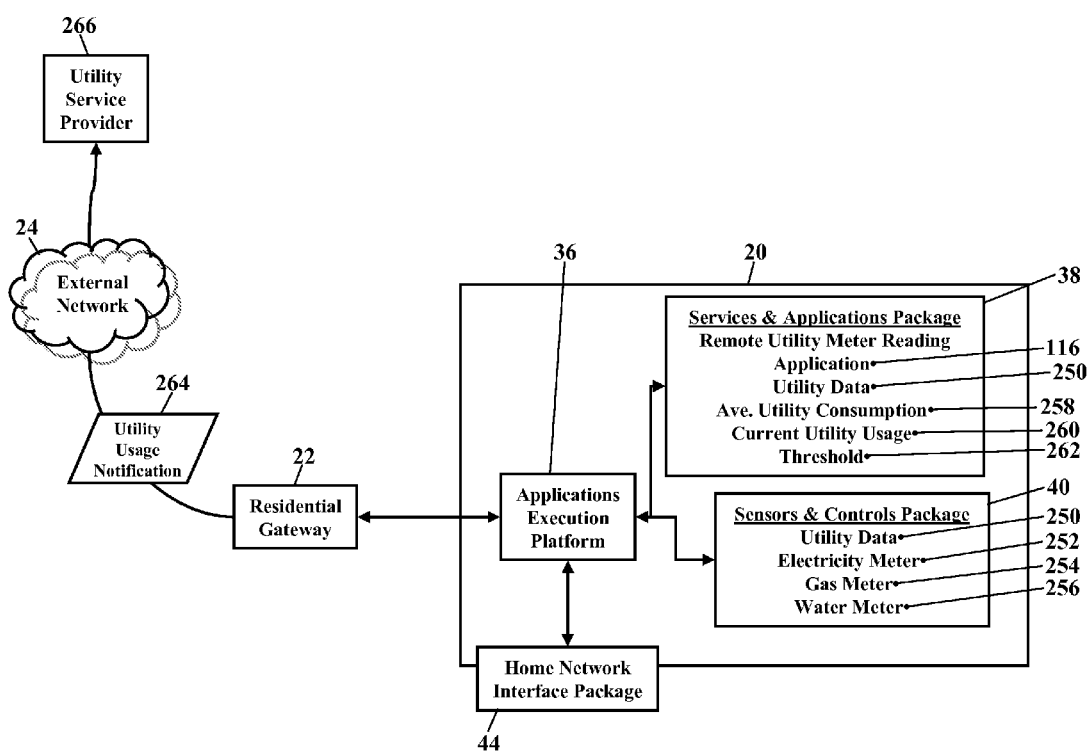
FIGS. 11-14 are schematics further illustrating a services and applications package and a sensors and controls package, according to even more exemplary embodiments.

FIG. 11 is a schematic further illustrating the services and applications package 38 and the sensors and controls package 40, according to even more exemplary embodiments. Here the multimedia applications gateway 20 stores and executes the remote utility meter application 116. The remote utility meter application 116 may receive utility data 250 from the sensors and controls package 40. As FIG. 11 illustrates, the sensors and controls package 40 may include interfaces and/or software drivers for an electricity meter 252, a natural or liquid propane gas meter 254, and a water meter 256. The remote utility meter application 116 allows the multimedia applications gateway 20 to monitor the customer's utility consumption. The multimedia applications gateway 20 may calculate an average utility consumption value 258. The average utility consumption value 258 may be determined based on short- and/or long-term utility readings, depending on the configuration. The average utility consumption value 258 is compared to a current utility usage reading 260. When the current utility usage reading 260 exceeds the average utility consumption value 258 by a configurable threshold value 262, then the remote utility meter application 116 causes the processor (illustrated as reference numeral 60 in FIG. 2) to send a utility usage notification 264 describing excessive consumption of electricity, gas, water, or other utility. The utility usage notification 264 may be addressed or routed to a utility service provider 266, thus alerting the utility service provider 266 to a potential problem in the customer's residence. The utility service provider 266 may then proactively dispatch repair personnel to investigate. The utility usage notification 264 may be addressed or routed to additional or alternative destinations, such as one or more of the customer's devices (e.g., cell phone or computer). The utility usage notification 264 alerts the customer to investigate a potential concern (e.g., leaking water heater).

Figure 12:
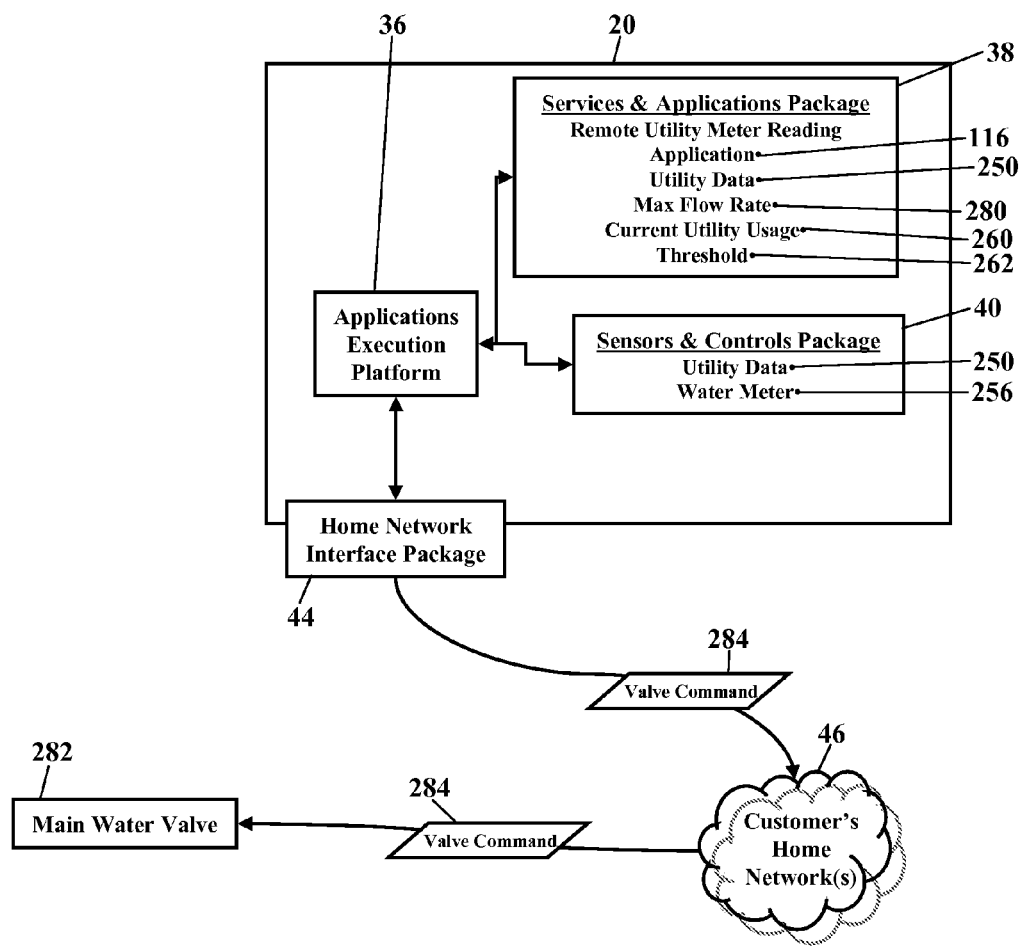
Figure 13:
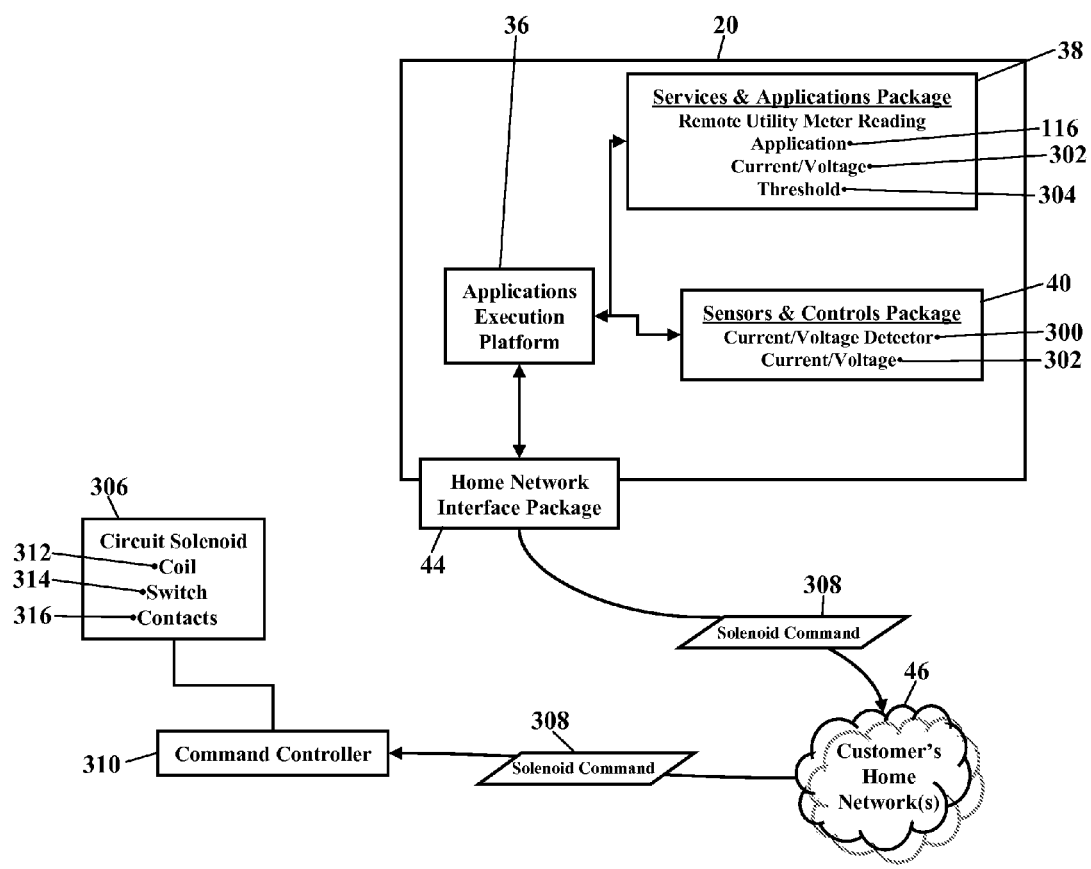

FIGS. 12 and 13 are schematics further illustrating the services and applications package 38 and the sensors and controls package 40, according to even more exemplary embodiments. Here the multimedia applications gateway 20 may autonomously stuff-off utility service when a utility anomaly occurs. As the above paragraphs explained, the remote utility meter application 116 allows the multimedia applications gateway 20 to monitor the customer's utility consumption. The multimedia applications gateway 20 may monitor the customer's instantaneous utility usage and help prevent catastrophic conditions which threaten life or property. When, for example, the utility data 250 from the water meter 256 exceeds a maximum permissible flow rate 280, the utility data 250 may indicate a leak in the customer's residence (e.g., water heater or water pipes). The multimedia applications gateway 20 may instruct or command an electromechanical main water valve 282 to close, thus stopping the supply of water to the customer's residence. FIG. 12, for example, illustrates the multimedia applications gateway 20 sending a valve command 284 to the electromechanical main water valve 282. The multimedia applications gateway 20, instead, may activate or command a valve controller to close the electromechanical main water valve 282. Regardless, when the electromechanical main water valve 282 closes, the remote utility meter application 116 may observe a reduction in water pressure and flow rate, eventually tending toward a zero reading. Similarly, the utility data 250 from the gas meter (illustrated as reference numeral 254 in FIG. 11) may also be used to determine when a gas leak is present. If a flow rate is observed, but a furnace, water heater, and gas fire place are not operating (and thus consuming gas), a leak may be present. If the gas flow rate exceeds a maximum permissible flow rate, the utility data 250 may indicate a gas leak. The multimedia applications gateway 20 may instruct or command an electromechanical main gas valve to close, thus stopping the flow of gas to the customer's residence.

FIG. 13 illustrates electricity consumption. Exemplary embodiments may also be applied to electric consumption. Here, though, exemplary embodiments may include current and/or voltage detectors 300 in the customer's residential wiring. The current and/or voltage detectors 300 may be installed in one or more electrical circuits to measure the electrical current and/or voltage in each circuit. When current and/or voltage 302 in any circuit exceed an associated threshold value 304, the electrical circuit may be experiencing a problem. Electrical current, for example, is especially dangerous to the human body, so an abnormal current may be a life-threatening situation. The multimedia applications gateway 20 may then instruct or command a circuit solenoid 306 to activate, thus closing the electrical circuit. The multimedia applications gateway 20, for example, may send a solenoid command 308 to a command controller 310. The solenoid command 308 may instruct the command controller 310 to send or apply predetermined current to the circuit solenoid 306. The predetermined current may energize a coil 312 within the circuit solenoid 306, setting up an electrical field that mechanically moves a switch 314. When the switch moves, the switch opens electrical contacts 316, thus preventing current to flow through the switch 314. The multimedia applications gateway 20 may also cause the processor 60 to send the utility usage notification (illustrated as reference numeral 264 in FIG. 11) describing excessive current or voltage.

Figure 14:
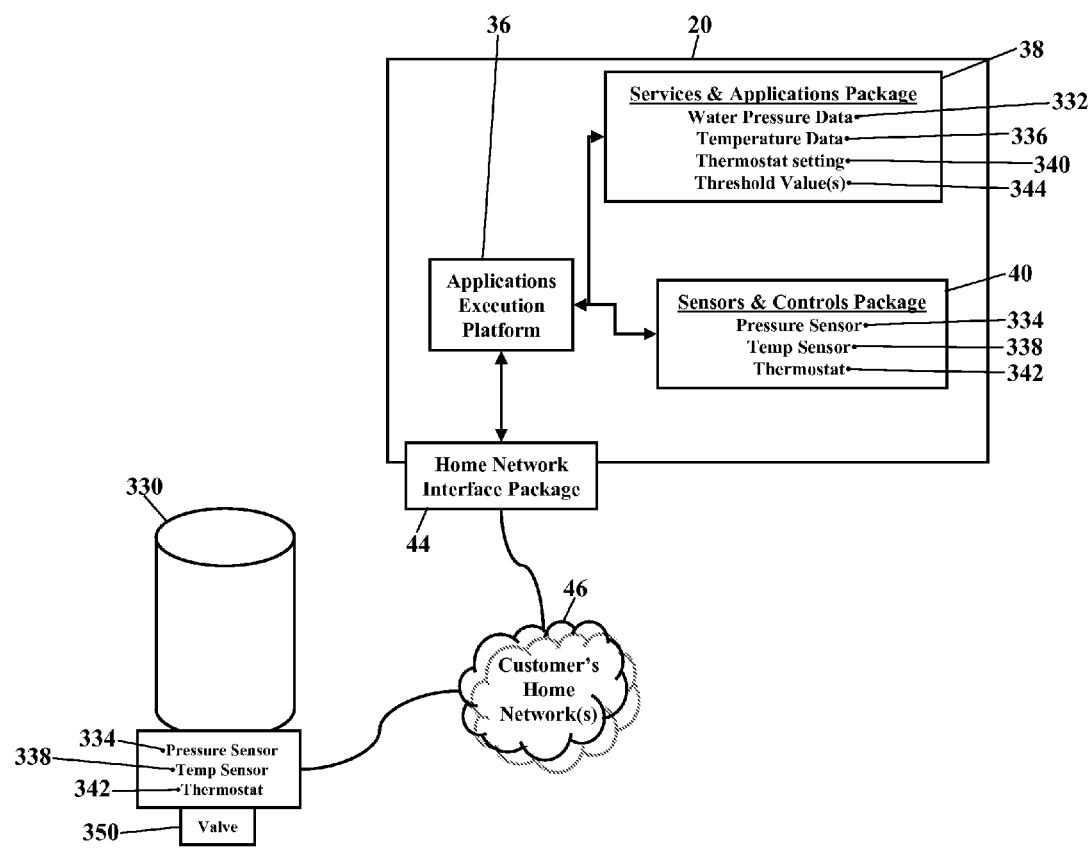

FIG. 14 is another schematic that further illustrates the services and applications package 38 and the sensors and controls package 40, according to even more exemplary embodiments. Here the sensors and controls package 40 may include interfaces to sensors in a customer's water heater 330. A leaking water heater is a significant concern for customers and for insurers, for obvious reasons. Exemplary embodiments, then, may monitor the customer's water heater 330 to help reduce damage from leaks and even a catastrophic failure. As FIG. 14 illustrates, the multimedia applications gateway 20 may receive water pressure data 332 from a water pressure sensor 334 in the customer's water heater 330. The multimedia applications gateway 20 may also receive water temperature data 336 from a water temperature sensor 338 in the customer's water heater 330. The multimedia applications gateway 20 may also receive a temperature setting 340 of a thermostat 342 at the customer's water heater 330. The services and applications package 38 may include a software component or module that estimates, determines, or models when the water heater 330 may experience a leak. For example, when the water pressure data 332 drops below a threshold value 344, the drop in pressure may indicate a leak. If a pressure rate of change exceeds a threshold pressure rate value, the pressure rate of change may further indicate a leak. If the water pressure data 332 drops below the threshold value 344, but the pressure rate of change is within normal limits, then the water heater 330 may be in a recovery mode of operation. Exemplary embodiments may then increase the temperature setting 340 of the thermostat 342 to recover a desired water temperature. When the water temperature data 336 drops below the desired water temperature, then exemplary embodiments may reduce the water pressure in the water heater 330 to recover the desired water temperature. Exemplary embodiments, for example, may open an electromechanical water valve 350 to relieve pressure in the water heater 330 and/or to discharge water from the water heater 330. When the water temperature data 336 exceeds a maximum permissible temperature value, then exemplary embodiments may open the electromechanical water valve 350 to reduce an over-pressure condition. Because the water heater 330 may be assumed to have a constant volume, the pressure and temperature of the water in the water heater 330 may be used to estimate or model when the water heater 330 may experience a leak.

Figure 15:
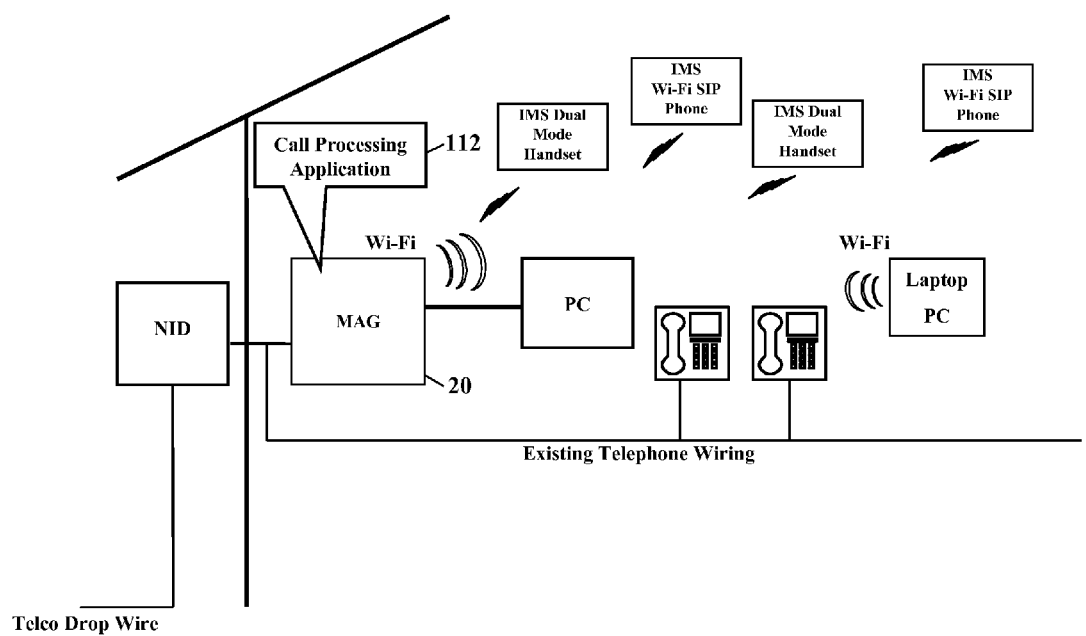
FIG. 15 is a schematic further illustrating the multimedia applications gateway, according to even more exemplary embodiments.

FIG. 15 is a schematic further illustrating the multimedia applications gateway 20, according to even more exemplary embodiments. Here the multimedia applications gateway 20 stores and executes the call processing application 112. The call processing application 112 may be downloaded as a component or module of the services and applications package (illustrated as reference numeral 38 in FIG. 1). The call processing application 112 locally processes the customer's Voice over Internet Protocol calls, whether originating or terminating at a device in the home network (illustrated as reference numeral 46 in FIG. 1) or wirelessly communicating with the multimedia applications gateway 20. The call processing application 112 may even establish, set-up, or create an IP-PBX functionality, allowing the customer to transfer calls between devices and to intercom calls to one or more locations. The call processing application 112 may also provide personalized rings or ringtones, depending on the device and/or the calling number. The customer may also configure the call processing application 112 to ring one device, simultaneously ring all devices, or even simultaneously ring only selected devices, again depending on the device and/or the calling number.

Figure 16:
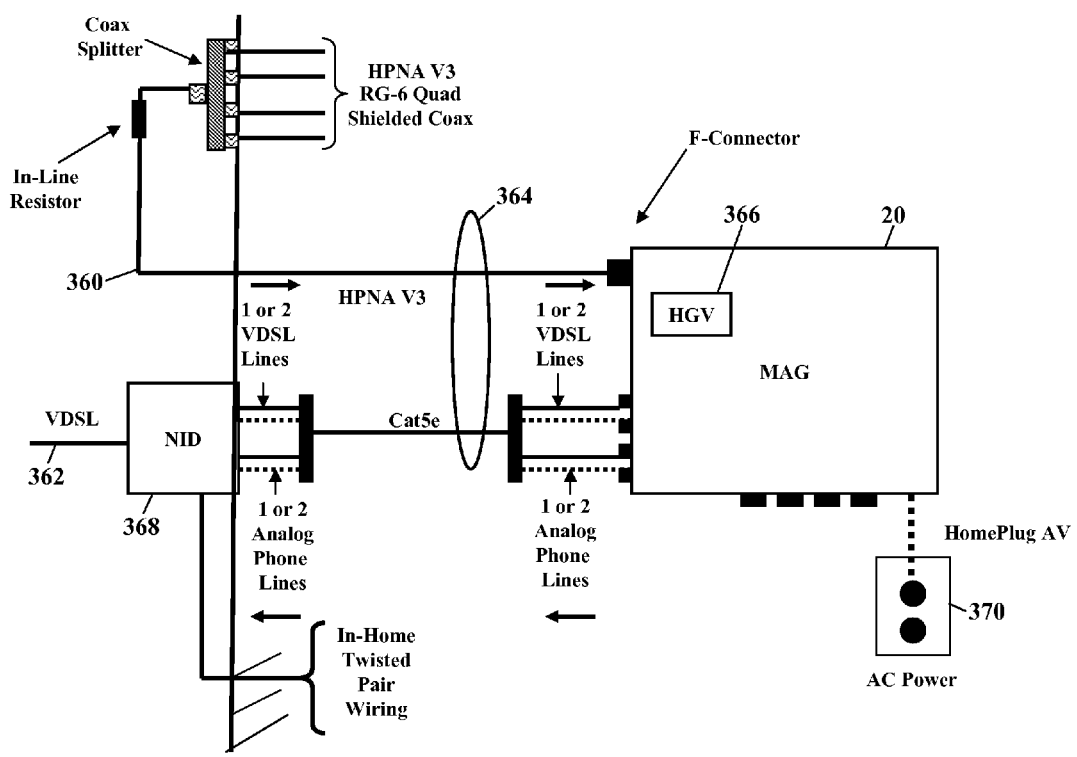
FIGS. 16 and 17 are more detailed schematics illustrating installation options for the multimedia applications gateway, according to even more exemplary embodiments.
Figure 17:
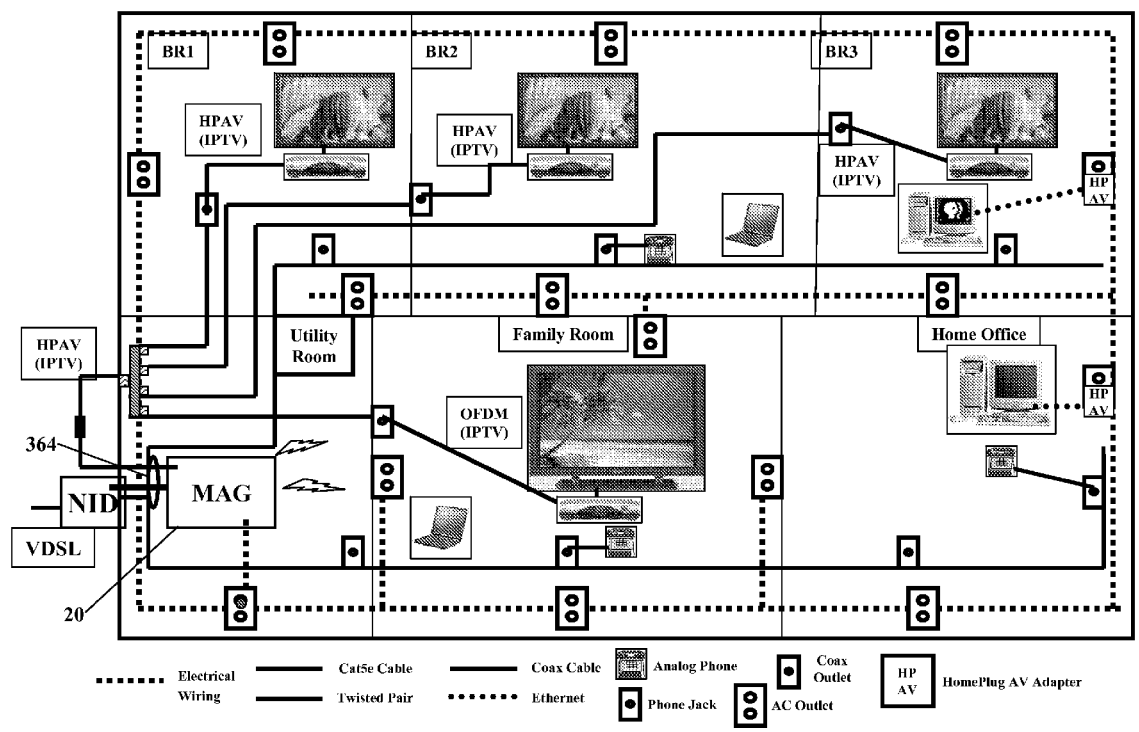
Figure 18:
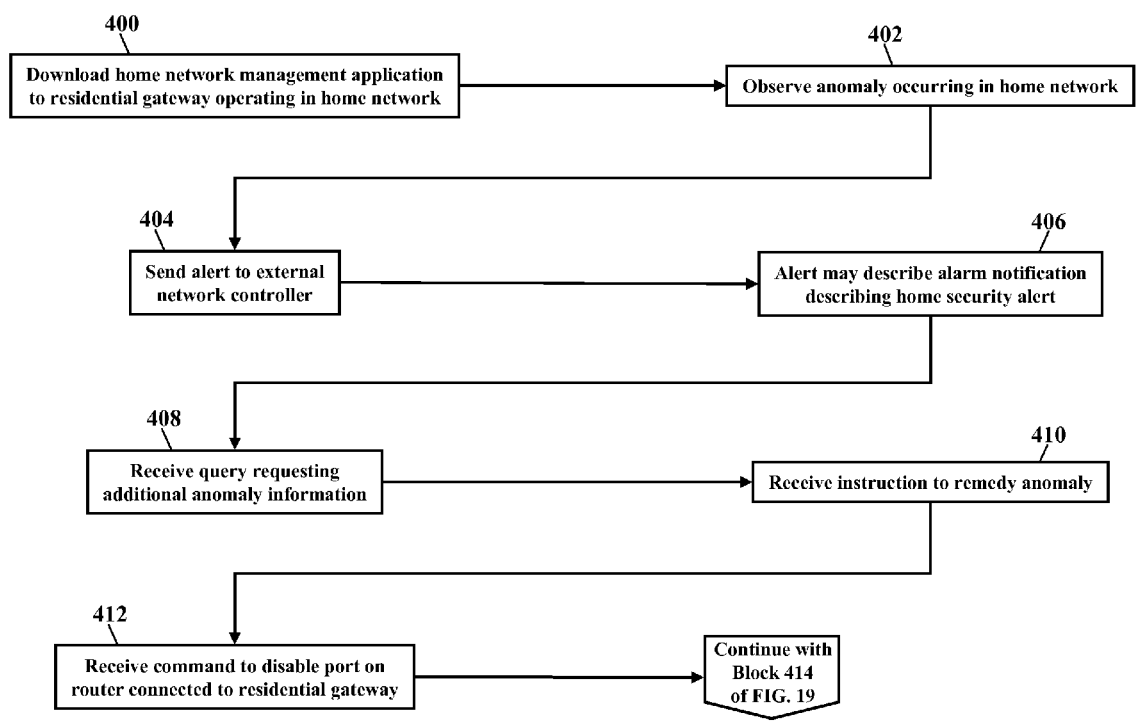
FIGS. 18-22 are flowcharts illustrating a method of monitoring a multimedia applications gateway, according to still more exemplary embodiments.

FIGS. 16 and 17 are more detailed schematics illustrating installation options for the multimedia applications gateway 20, according to even more exemplary embodiments. FIG. 16 illustrates a possible installation wiring scheme for interfacing the multimedia applications gateway 20 to a coaxial cable 360 and/or to a digital subscriber line 362. That is, this exemplary embodiment interfaces the multimedia applications gateway 20 to the cable network and to the copper or telephony network (illustrated, respectively, as reference numerals 26 and 28 in FIG. 1). Here, a cable sheath 364 containing one Cat5e cable and/or one RG-6 quad-shielded coaxial cable may be installed to a 3800 HGV plug-in card 366 in the multimedia applications gateway 20. Although the multimedia applications gateway 20 may be mounted or installed at any location within the customer's residence, the multimedia applications gateway 20 is preferably installed as close as possible to a network interface device ("NID") 368 and receives AC power from an AC outlet 370. FIG. 17 illustrates a whole-home installation, in which the multimedia applications gateway 20 interfaces with coaxial cables, one or more digital subscriber lines, electrical wiring, and phone wiring. Again, the cable sheath 364 containing a Cat5e cable and/or an RG-6 quad-shielded coaxial cable may connect to the multimedia applications gateway 20.

FIGS. 18-22 are flowcharts illustrating a method of monitoring the multimedia applications gateway 20, according to still more exemplary embodiments. The home network management application 104 is downloaded to the multimedia applications gateway 20 operating in the customer's home network 46 (Block 400). The anomaly 202 is observed that occurs in the home network 46 (Block 402). The alert 200 is sent to the external network controller 146, and the alert 200 describes the anomaly 202 in the home network 46 (Block 404). The alert 200 may comprise an alarm notification that describes a home security alert (Block 406). A query is received that requests additional information describing the anomaly 202 (Block 408). An instruction is received from the external network controller 146 to remedy the anomaly 202 (Block 410). The instruction may comprise a command to disable a port on a router connected to the multimedia applications gateway 20 (Block 412).

Figure 19:
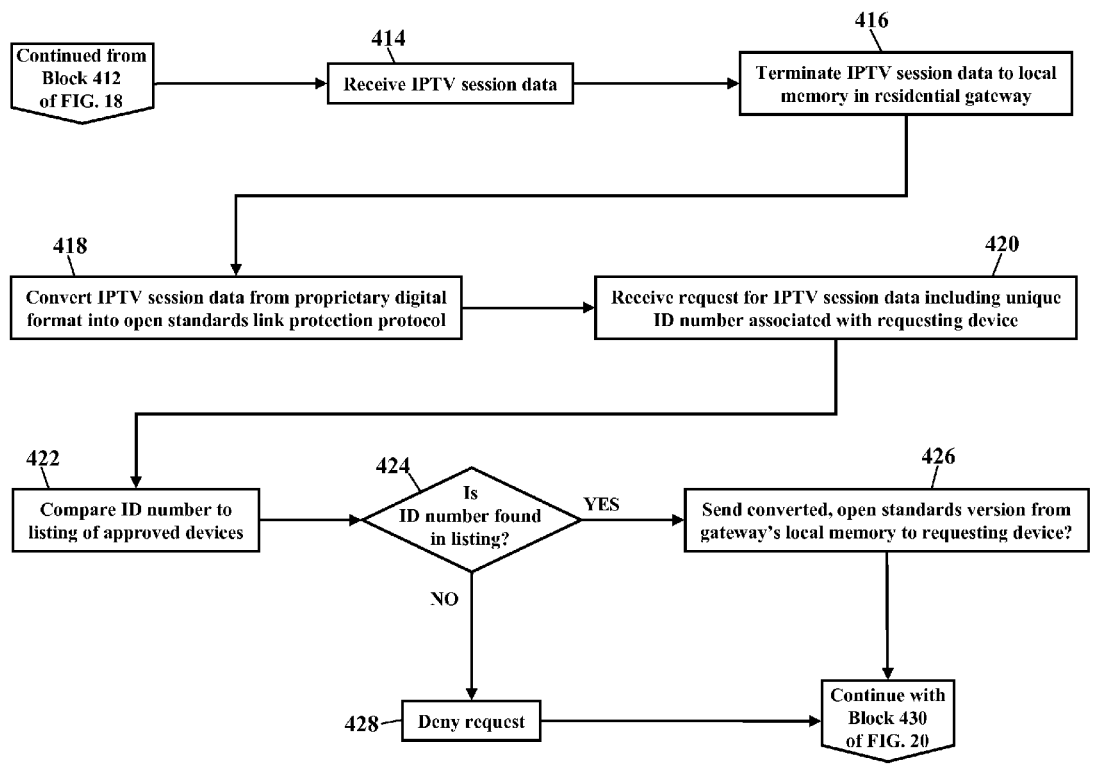

The flowchart continues with FIG. 19. When an Internet Protocol television session data is received (Block 414), the Internet Protocol television session data is terminated to local memory 64 in the multimedia applications gateway 20 (Block 416). The Internet Protocol television session data is converted from proprietary digital format into an open standards link protection protocol (Block 418). A request for the Internet Protocol television session data is received, and the request includes the unique identification number 218 associated with the requesting device 214 (Block 420). The device's unique identification number 218 is compared to the listing 216 of approved devices (Block 422). If the device's unique identification number 218 is found in the listing 216 of approved devices (Block 424), then the converted, open standards version of the Internet Protocol television session is sent from the local memory 64 in the multimedia applications gateway 20 to the requesting device 214 (Block 426). If, however, the device's unique identification number 218 is not found in the listing 216 of approved devices (Block 424), then the request is denied (Block 428).

Figure 20:
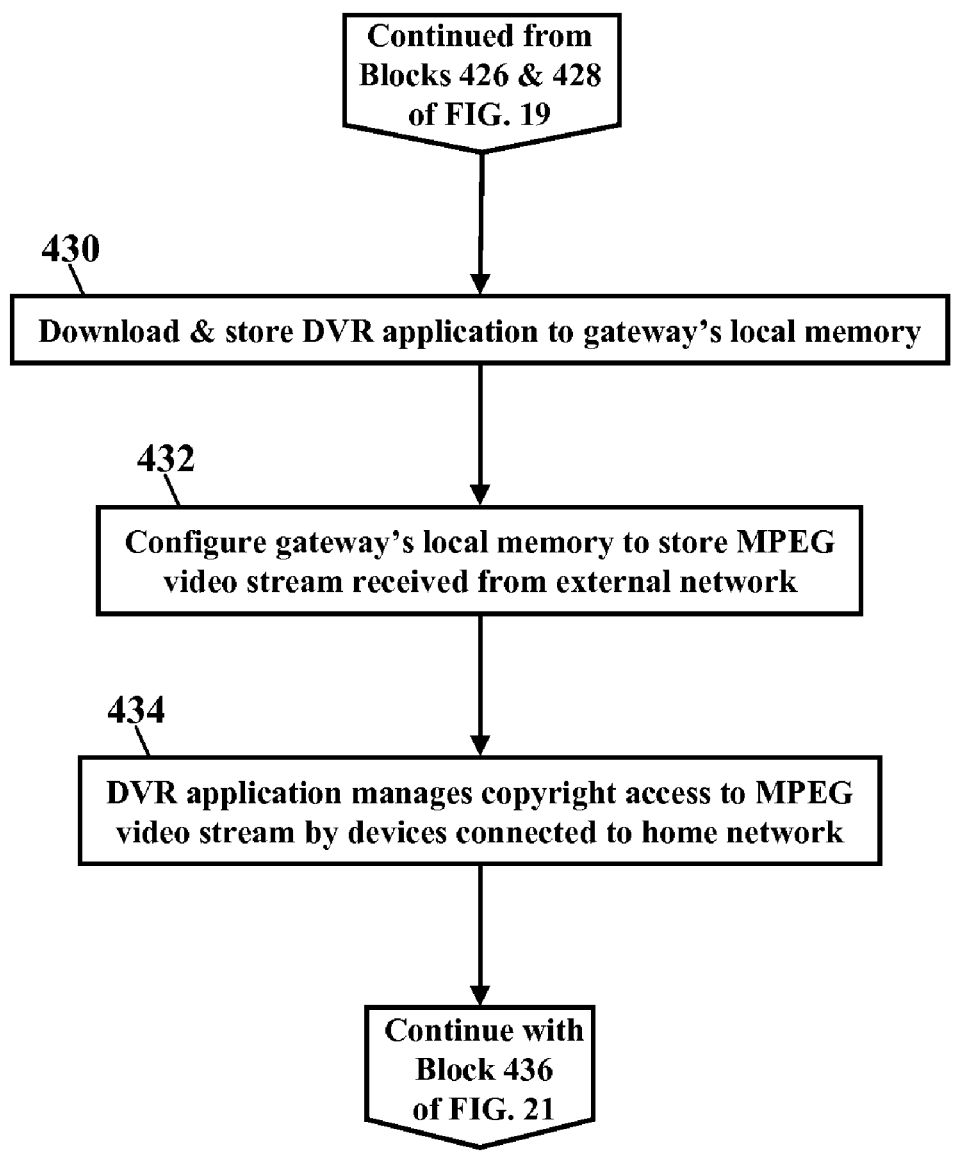

The flowchart continues with FIG. 20. The digital video recorder ("DVR") application 230 is downloaded and stored to the local memory 64 in the multimedia applications gateway 20 (Block 430). The local memory 64 is configured to store an MPEG video stream received from the external network 24 (Block 432). The DVR application 230 manages copyright access to the MPEG video stream by devices connected to the home network 46 (Block 434).

Figure 21:
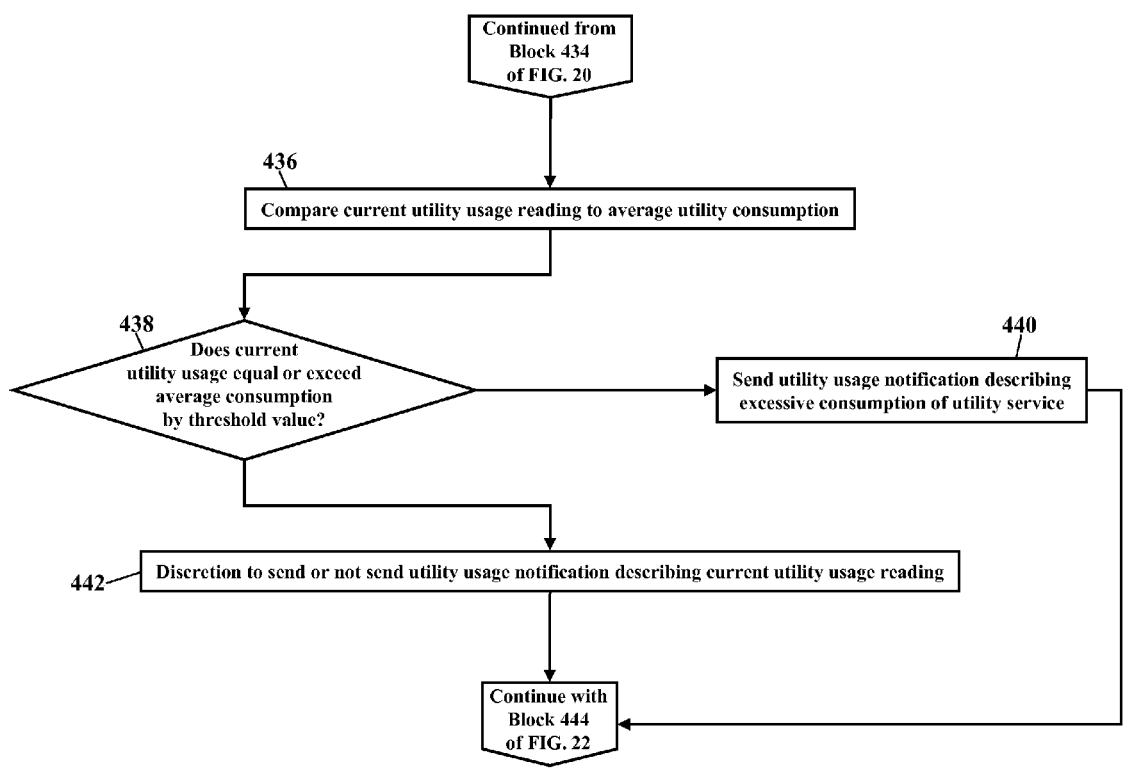

The flowchart continues with FIG. 21. The current utility usage reading 260 is compared to the average utility consumption 258 (Block 436). When the current utility usage reading 260 equals or exceeds the average utility consumption 258 by the threshold value 262 (Block 438), then the utility usage notification 264 is sent that describes excessive consumption of a utility service (Block 440). If the current utility usage reading 260 is less than the average utility consumption 258 (Block 438), then the multimedia applications gateway 20 has discretion to send, or not send, the utility usage notification 264 describing the current utility usage reading 260 (Block 442).

Figure 22:
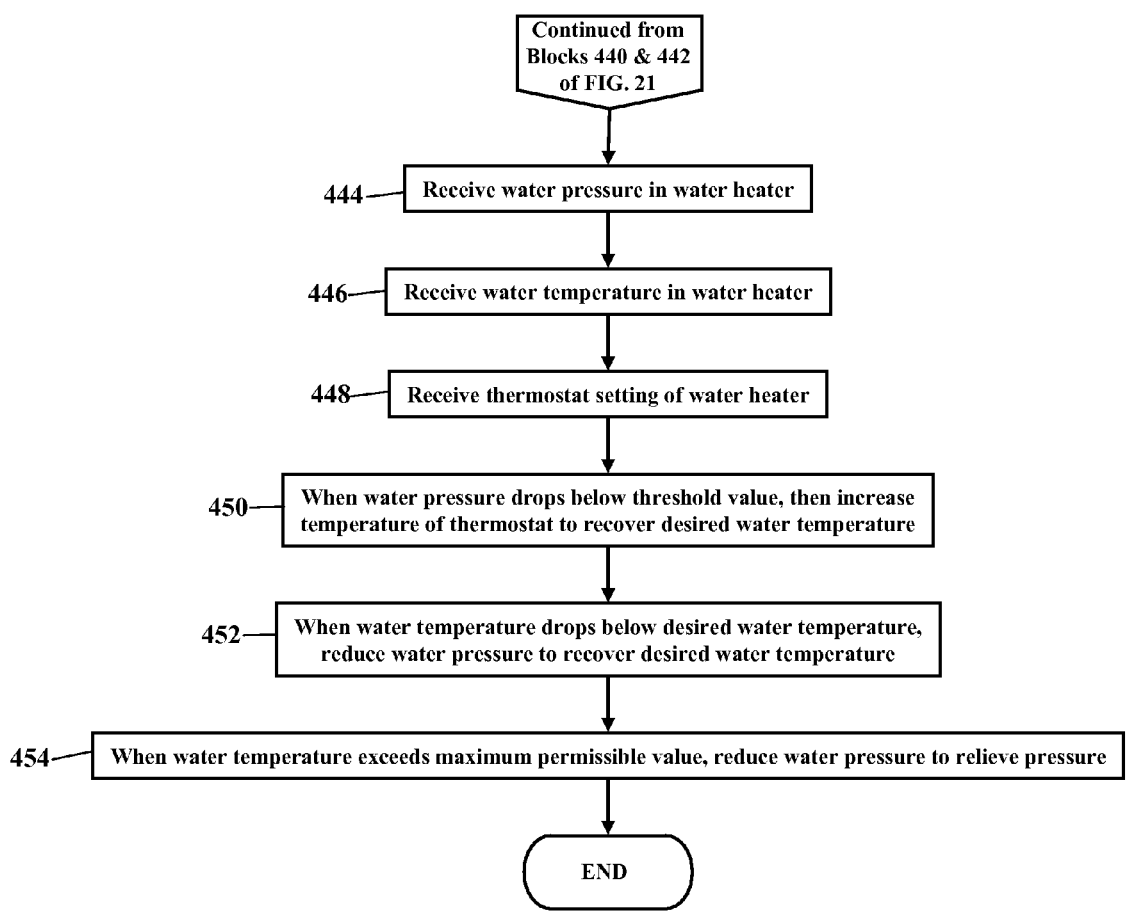

The flowchart continues with FIG. 22. The water pressure 332 (Block 444) and the water temperature 336 (Block 446) of the water heater 330 is received. The thermostat setting 340 may also be received (Block 448). When the water pressure 332 drops below the threshold value 344, then the temperature of the thermostat setting is increased to recover a desired water temperature (Block 450). When the water temperature 336 drops below the desired water temperature, then the water pressure 332 is reduced to recover the desired water temperature (Block 452). When the water temperature 336 exceeds a maximum permissible value, then the water pressure 332 is reduced to relieve an over-pressure condition (Block 454).

Figure 23:
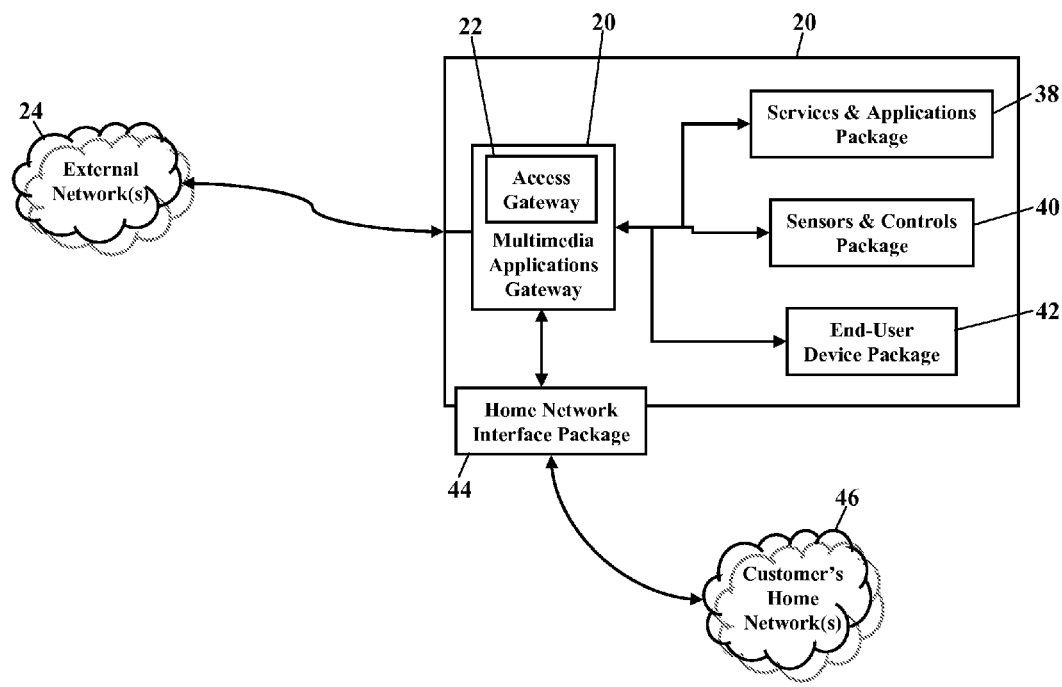
FIGS. 23 and 24 are more schematics illustrating the multimedia applications gateway, according to even more exemplary embodiments.

FIG. 23 is another schematic illustrating the multimedia applications gateway 20, according to even more exemplary embodiments. Here the functions of the residential gateway 22 are embedded into the multimedia applications gateway 20. That is, the functional operations and features of the residential gateway 22 (such as a digital subscriber line modem, cable modem, modulator, and/or router) are incorporated into the multimedia applications gateway 20. Because the residential gateway 22 may be embedded in the multimedia applications gateway 20, exemplary embodiments further permit a service provider to manage and to remotely diagnose the multimedia applications gateway 20 and the customer's home network 46. Here, then, the multimedia applications gateway 20 further permits the service provider to provide proactive network management, performance monitoring and reporting, self-help diagnostics, improved diagnostic capability, and remote management. Exemplary embodiments also permit the service provider to offer a consistent entertainment/content experience and mass storage capabilities for the customer's content items. The multimedia applications gateway 20 allows conventional set-top box deployment strategies to evolve to Digital Living Network Alliance compliant devices.

Figure 24:
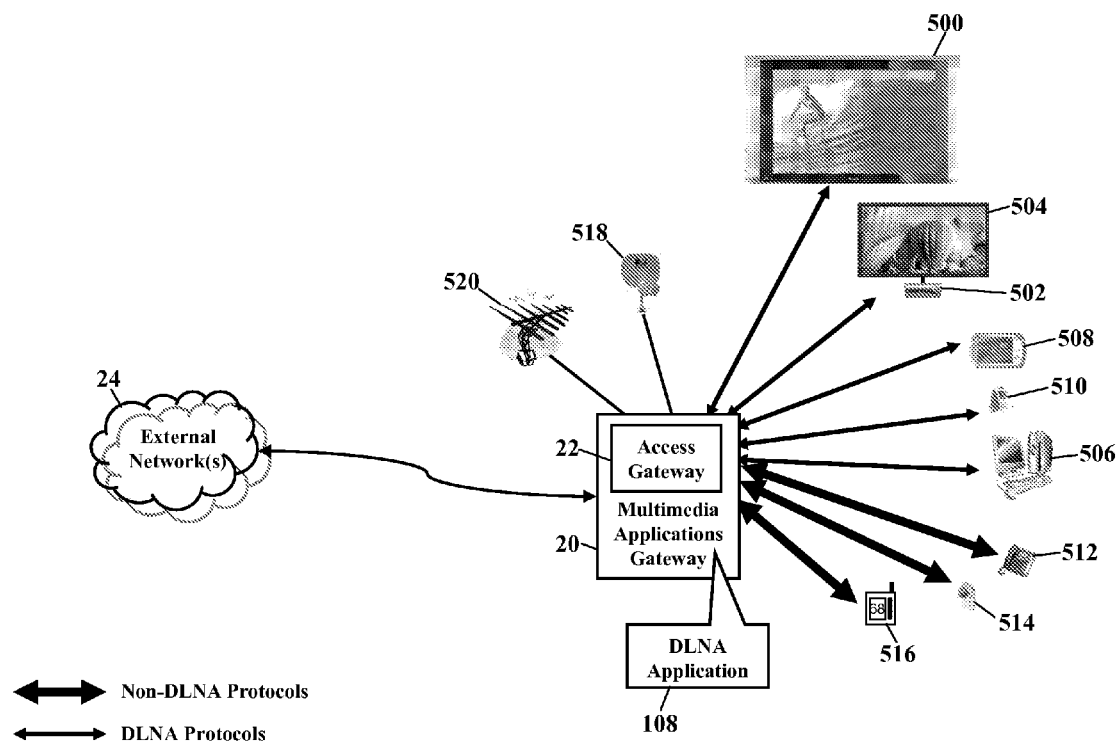

FIG. 24 is another schematic illustrating the multimedia applications gateway 20, according to even more exemplary embodiments. Here the multimedia applications gateway 20 is illustrated as interfacing with some of the user's devices (via the customer's home network, illustrated as reference numeral 46 in at least FIGS. 1 and 23). Because the multimedia applications gateway 20 may store and execute the DLNA application 108, the multimedia applications gateway 20 may interface with DLNA-compliant devices and with non-DLNA devices. The multimedia applications gateway 20, for example, may have plug-and-play capabilities with a DLNA-compliant television 500 and/or with a DLNA-compliant set-top box 502 and television 504. The application execution platform 36 may also have plug-and-play capabilities with a computer 506, wireless personal digital assistant 508, and wireless phone 510. Yet the multimedia applications gateway 20 may also interface with non-DLNA compliant devices, such as analog/digital/VoIP phone 512, camera 514, and radio 516. The multimedia applications gateway 20 may even include interfaces to a linear satellite network (represented by satellite dish antenna 518) and to a linear terrestrial television network (represented by aerial antenna 520).

The customer benefits from the multimedia applications gateway 20. The customer has a single "box" in the home, and the customer's home network 46 may be managed by the service provider of the multimedia applications gateway 20. As earlier paragraphs explained, the multimedia applications gateway 20 may store self-service applications/tools that help resolve problems or issues in the customer's home network 46. Because the multimedia applications gateway 20 is provided by the service provider, the customer has a single customer care contact. A common and consistent user interface also allows the user to quickly and easily navigate to proven and validated features. The plug-and-play capabilities also make for simple expansion and device interfaces.

The service provider also benefits from the multimedia applications gateway 20. Because the customer has a single, remotely administered "box" in the customer's home, the service provider may conquer the customer's residential networking needs and provide complete ability to remotely resolve home networking issues. The multimedia applications gateway 20 provides one interface to the customer's devices and a common in-home infrastructure for satellite and IPTV services. A common, open-systems service platform also reduces costs and reduces operating expenses.

Figure 25:
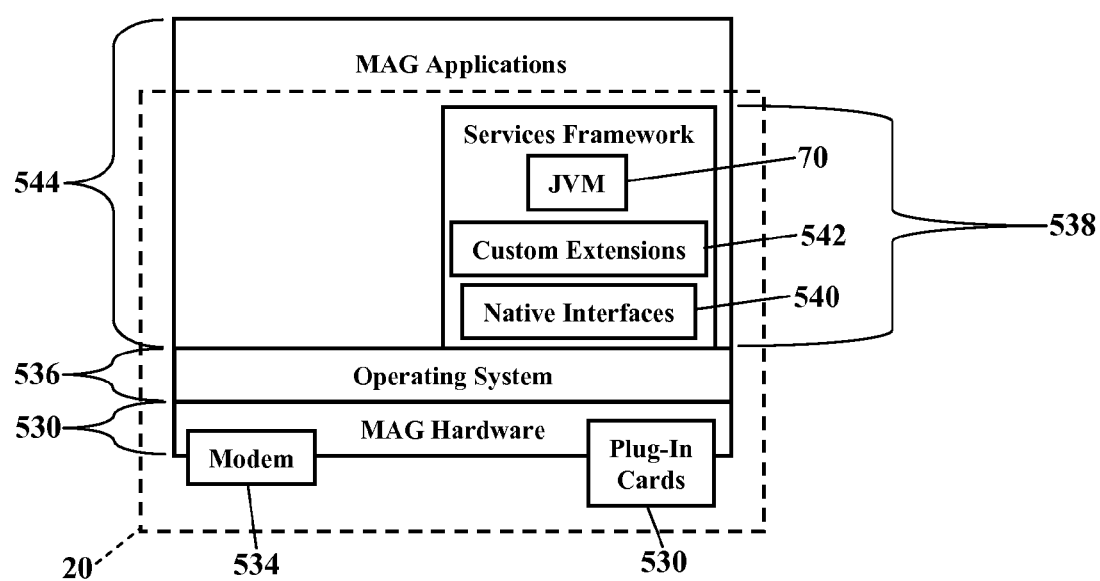
FIGS. 25 and 26 illustrate architectural schematics of the multimedia applications gateway, according to even more exemplary embodiments.
Figure 26:
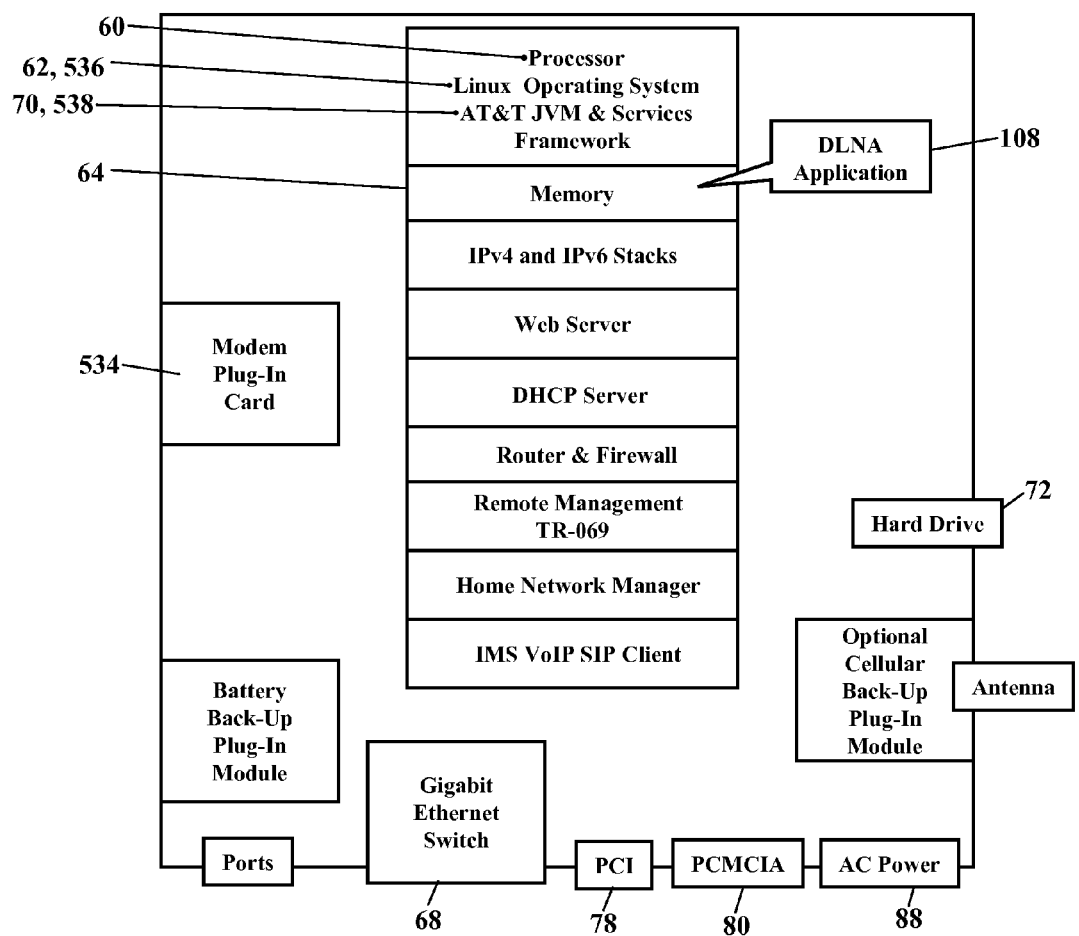

FIGS. 25 and 26 are more architectural schematics of the multimedia applications gateway 20, according to even more exemplary embodiments. FIG. 25 illustrates a layered architecture, while FIG. 26 is a higher-level, modular description. A hardware layer 530 represents the physical, hardware components. The hardware layer 530 may include one or more slots for insertion of optional plug-in cards 532. These plug-in cards 532 allow the multimedia applications gateway 20 to provide additional functions and features, such as a satellite network interface, an Internet Protocol television service, voice-over Internet protocol phone service, or a home-based wireless access point (such as a Femtocell). The hardware layer 530 may also include one or more slots for insertion of modem cards 534, such as a digital subscriber line modem (e.g., ADSL, VDSL, and/or pair-bonded VDSL) or a cable network modem. The hardware layer 530 preferably utilizes as many commodity components as possible, from one or more suppliers/vendors, to decrease unit cost. Correspondingly, the multimedia applications gateway 20 may also include an operating system layer 536. The multimedia applications gateway 20 is preferably an open systems, standards-based application execution platform that may be remotely administered and managed. The JAVA® Virtual Machine ("JVM") 70 may be functionally included in a services framework 538, along with native interfaces 540 and with custom extensions 542. A MAG Applications layer 544 may represent LINUX®, JAVA®, and native software applications that are executed by the JAVA® Virtual Machine 70, the services framework 538, the operating system layer 536, and/or the hardware layer 530. Conceptually, though, the MAG Applications layer 544 may be separately managed from the multimedia applications gateway 20. The LINUX® and JAVA® software applications may be sourced from different vendors, and each vendor may even remotely manage and/or administer their corresponding application. The multimedia applications gateway 20 may thus be an in-home application execution platform where the service provider may control the software platform. The LINUX® and JAVA® software applications may be rapidly created and marketed for new services.

The DLNA application 108 facilitates DLNA-compliant devices. Because the multimedia applications gateway 20 may interface with any of the external networks (illustrated as reference numeral 24 in FIG. 1), the multimedia applications gateway 20 may access many content sources having different digital rights management schemes. As earlier paragraphs explained, the DLNA application 108 may automatically convert from a proprietary, network-based digital rights management scheme to the DLNA-compliant digital rights management scheme. The multimedia applications gateway 20 serves or delivers the multimedia content to DLNA-compliant devices over the customer's home network 46. The multimedia applications gateway 20 thus utilizes the Digital Living Networking Alliance standards to provide a consistent user experience for various network-based multimedia content services on DLNA-compliant set-top boxes, televisions, and other devices. Exemplary embodiments may also adjust the resolution of the multimedia content to the user's device. The DLNA application 108 may also have communications architecture real-time services (or "CARTS") capabilities and Internet capabilities. The DLNA application 108 may also use metadata from the content sources, or content items, to generate CEA-2014 user experiences. As those of ordinary skill in the art understand, the CEA-2014 standard defines mechanisms for remotely displaying a user interface based on the UPnP Device Architecture v1.0 for UPnP networks and UPnP devices in the home. The DLNA application 108 may also generate metadata that advertises the service provider's services and products.

Figure 27:
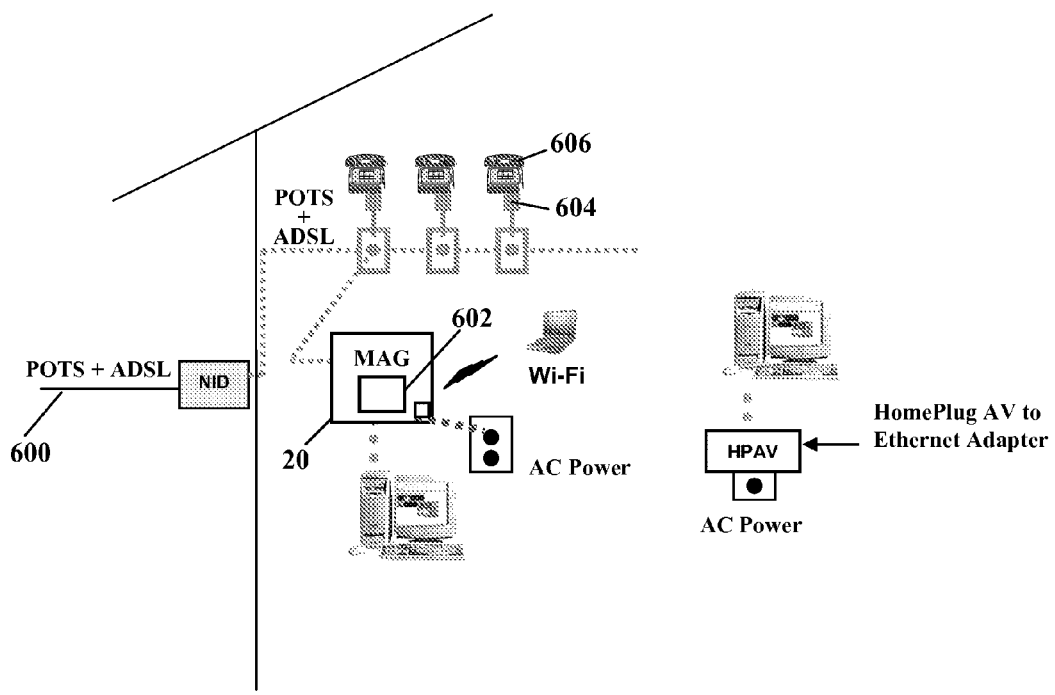
FIGS. 27-29 are schematics illustrating various installations of the application execution platform 36 in a single family unit, according to more exemplary embodiments.
Figure 28:
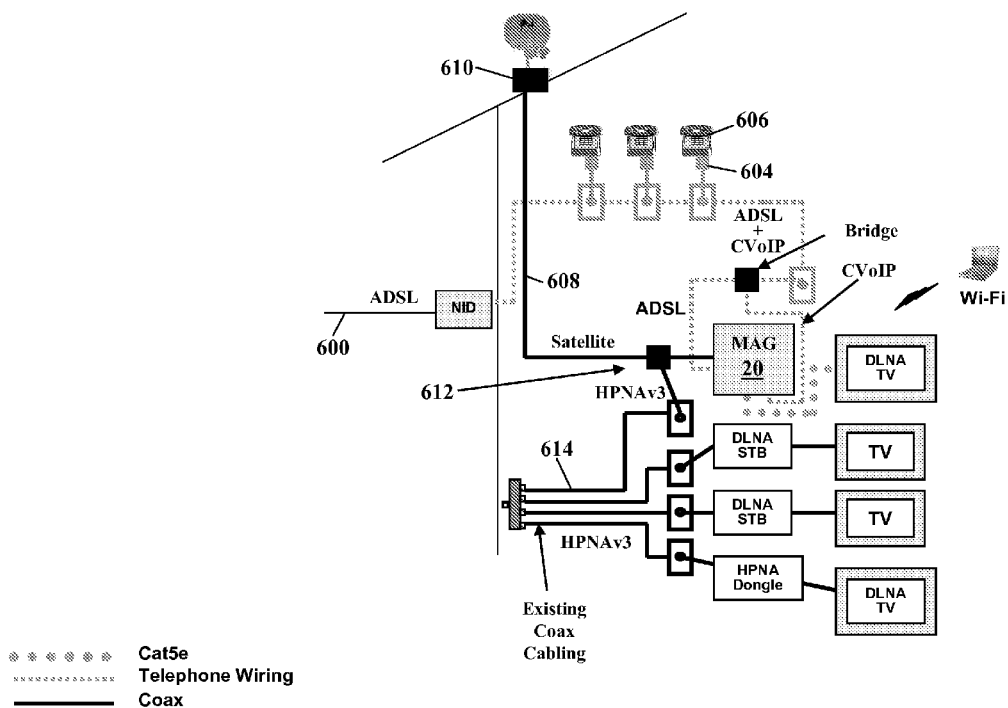
Figure 29:
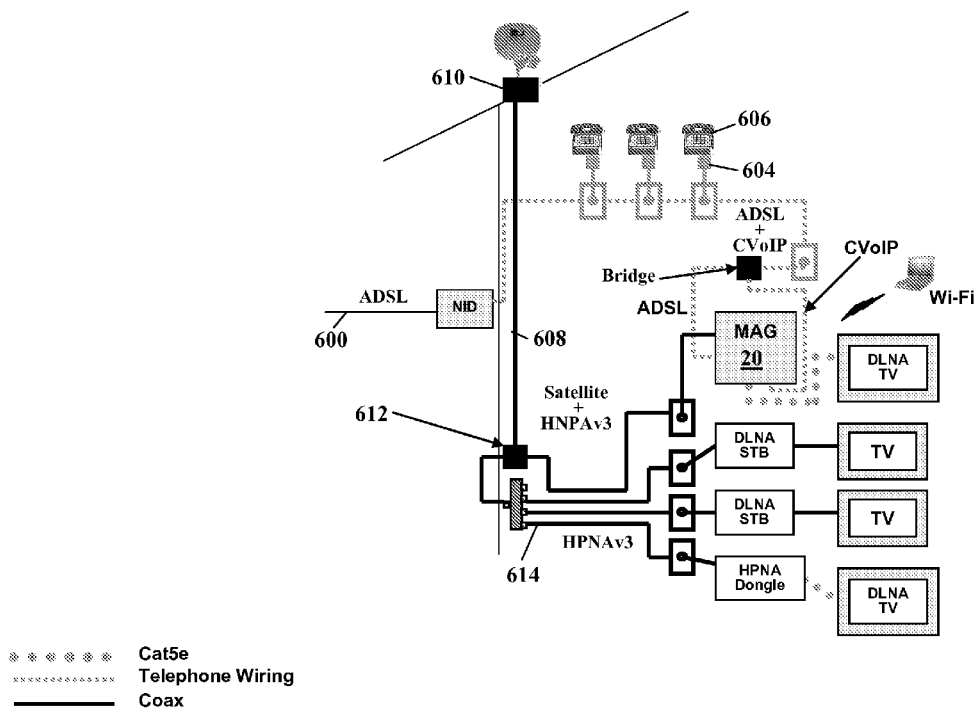

FIGS. 27-29 are schematics illustrating various installations of the multimedia applications gateway 20 in a single family unit, according to more exemplary embodiments. Here the multimedia applications gateway 20 receives signal and content from a combined asynchronous digital subscriber line (ADSL) over a plain old telephone system (POTS) input 600. Here, then, the multimedia applications gateway 20 may have an ADSL plug-in card 602 for receiving and processing ADSL signals. One or more DSL analog filters 604 filter analog telephony signals from the ADSL-POTS input 600 for delivery to corresponding analog telephones 606. The multimedia applications gateway 20 may also have powerline networking capabilities to receive both electrical power and signals via electrical wiring (e.g., "HomePlug").

FIGS. 28 and 29 illustrate the multimedia applications gateway 20 receiving signals from both the ADSL input 600 and a coaxial cable line 608. The coaxial cable line 608 is illustrated as conveying signals from satellite receiver/antenna/switch 610, but the coaxial cable line 608 may convey signals from other networks and/or service providers (such as a cable headend). Although not shown for simplicity, here the multimedia applications gateway 20 may have multiple plug-in cards that support ADSL processing (such as the ADSL plug-in card 602 in FIG. 27), cable signal processing, cable with Voice-over Internet Protocol processing, and digital broadcasting system signals. FIG. 28 illustrates the coaxial cable line 608 feeding signals to a diplexer 612 which, in turn, feeds the multimedia applications gateway 20. The diplexer 612, though, splits off HNPAv3-compliant signals and sends them to an existing coaxial cable system 614. As those of ordinary skill in the art understand, the HNPAv3 signals comply with a networking standard developed by the Home Phoneline Networking Alliance (or "HomePNA"). This technology allows all the components of a home or business network to interact over existing telephone wiring. In FIG. 29, the coaxial cable line 608 feeds signals to the diplexer 612, and the diplexer 612 splits off the HNPAv3-compliant signals and feeds them to the existing coaxial cable system 614.

Figure 30:
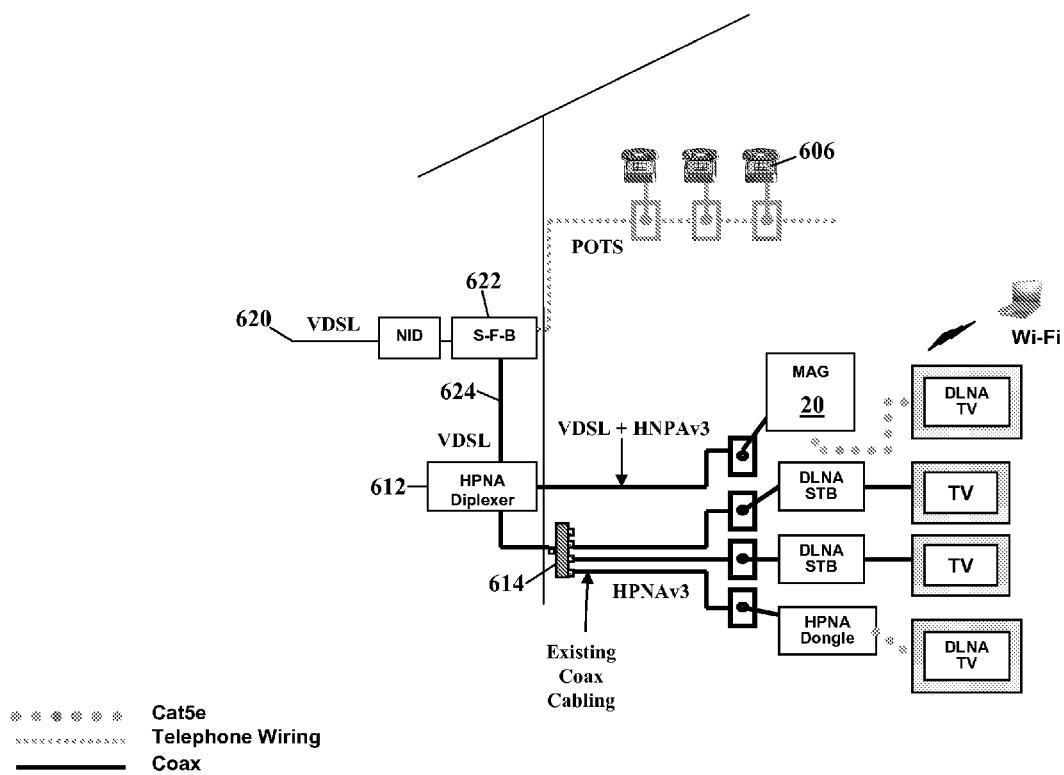
FIGS. 30-37 are schematics illustrating more installations, according to more exemplary embodiments.
Figure 31:
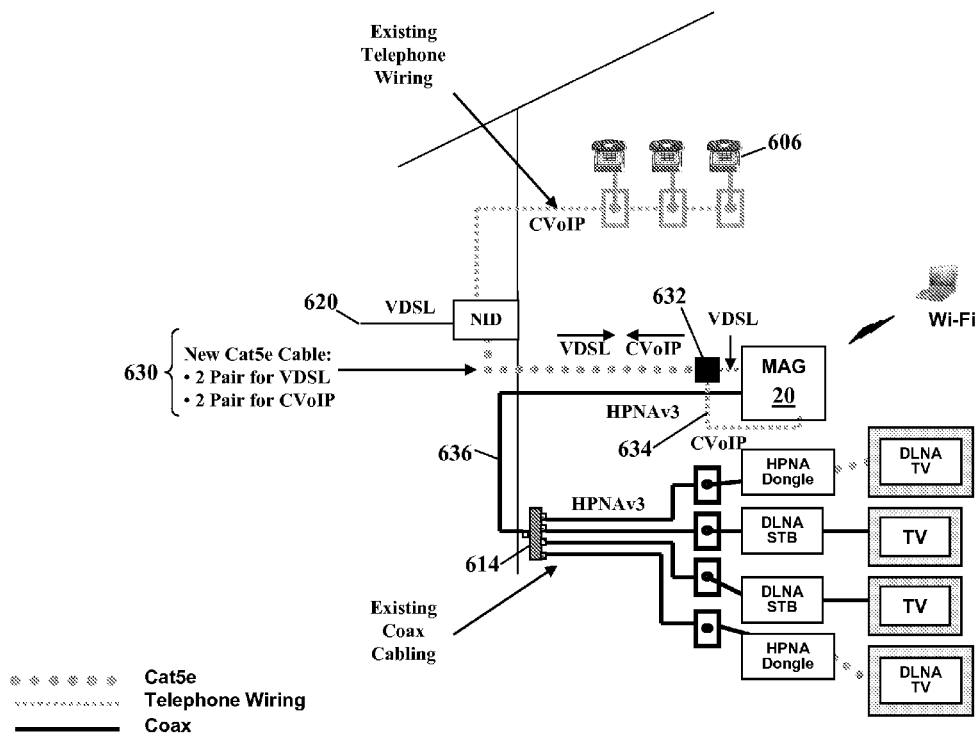
Figure 32:
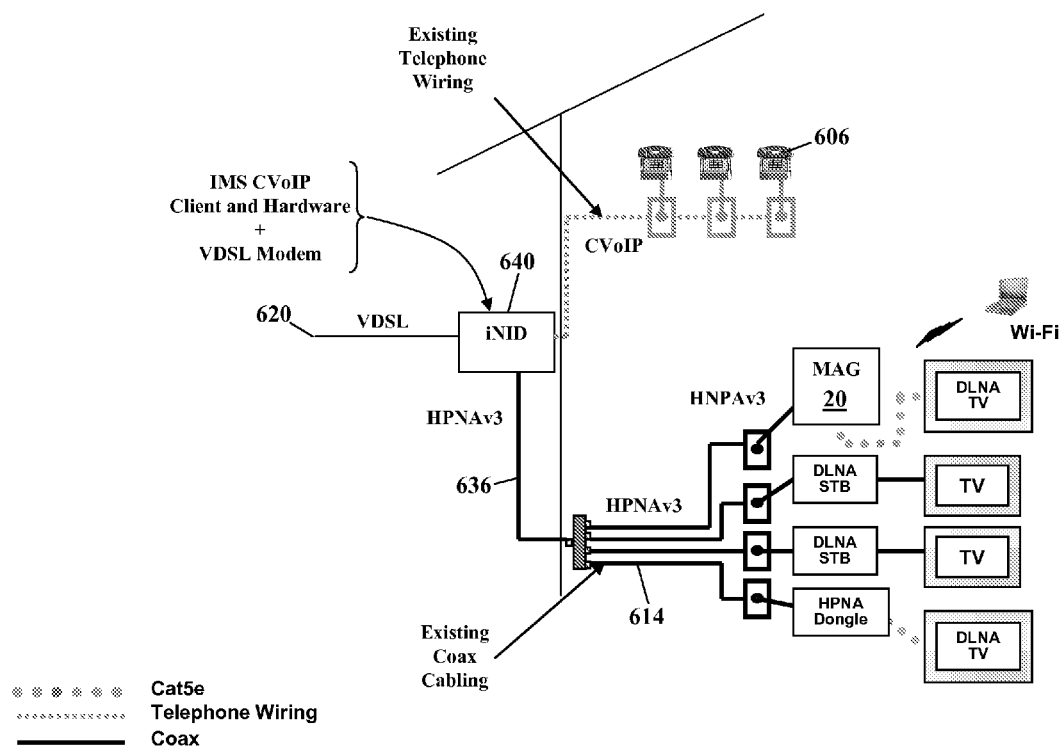
Figure 33:
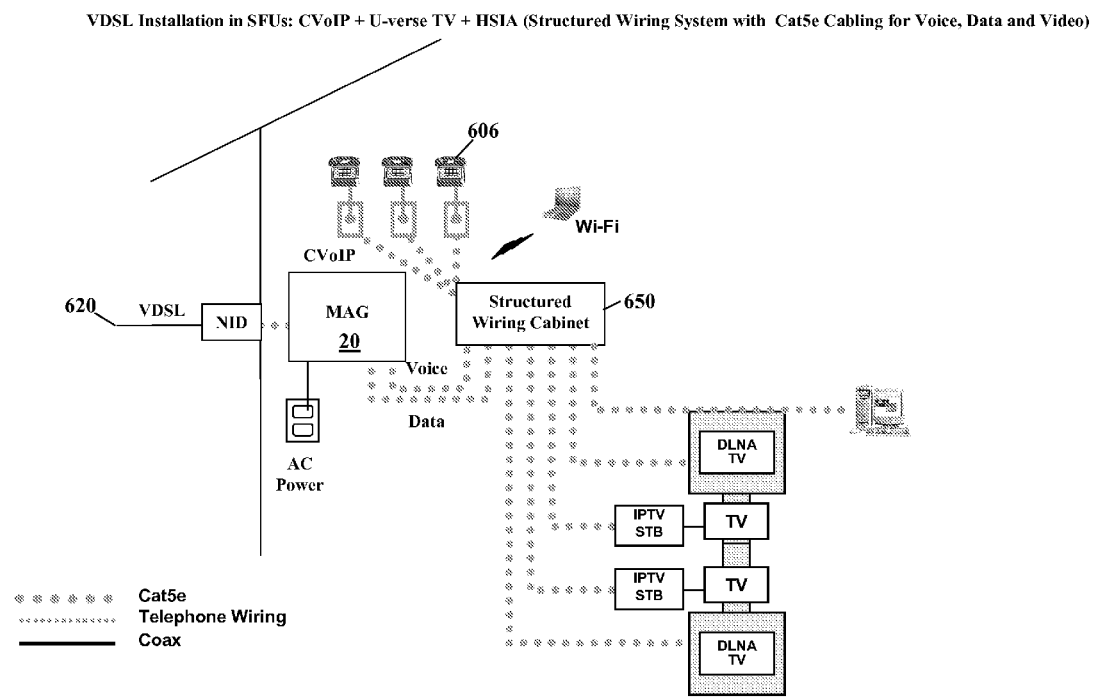
Figure 34:
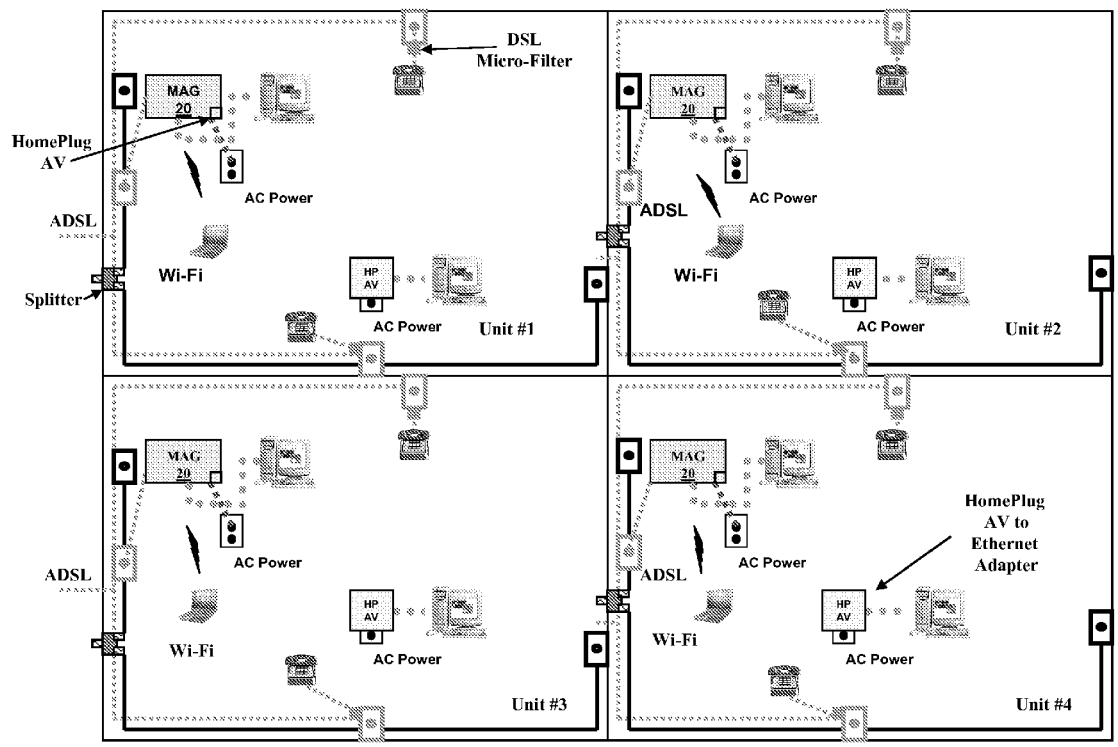
Figure 35:
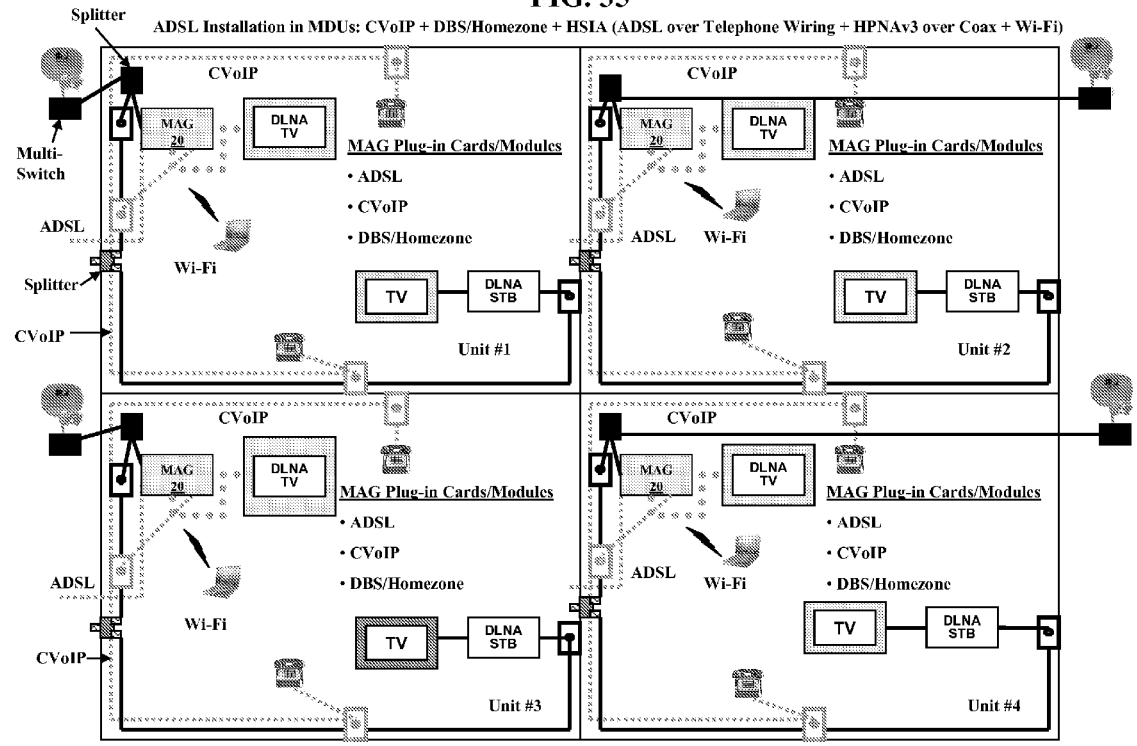
Figure 36:
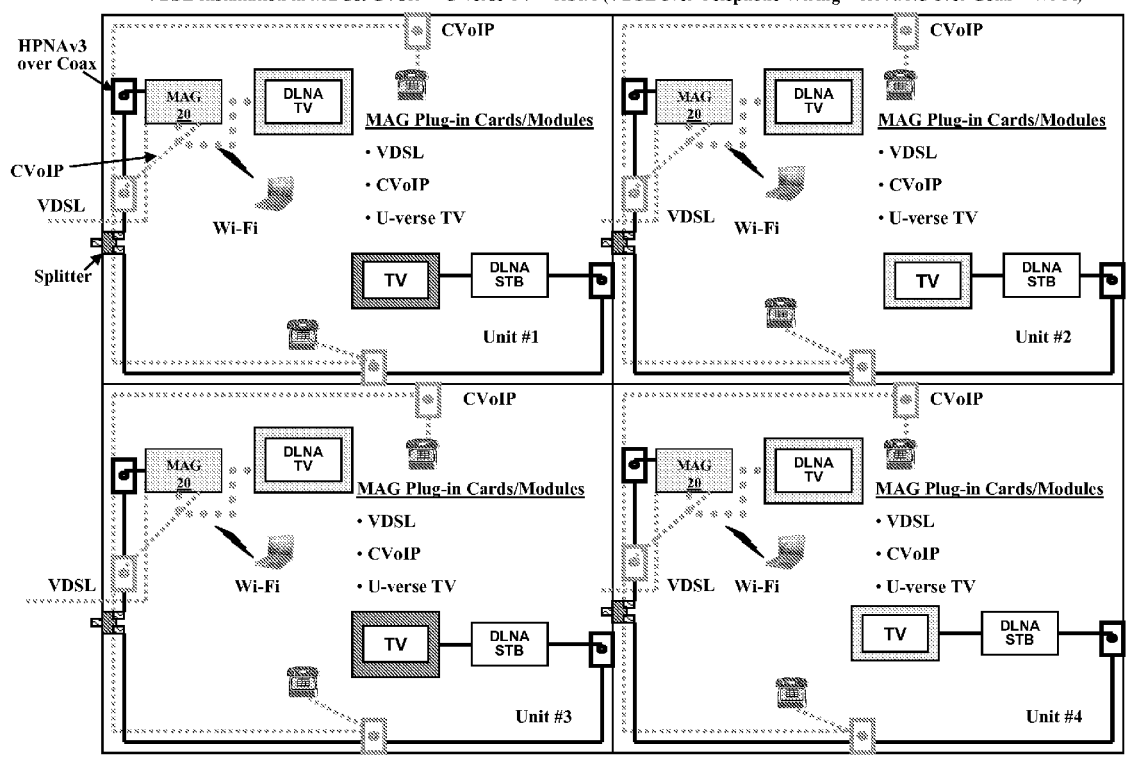
Figure 37:
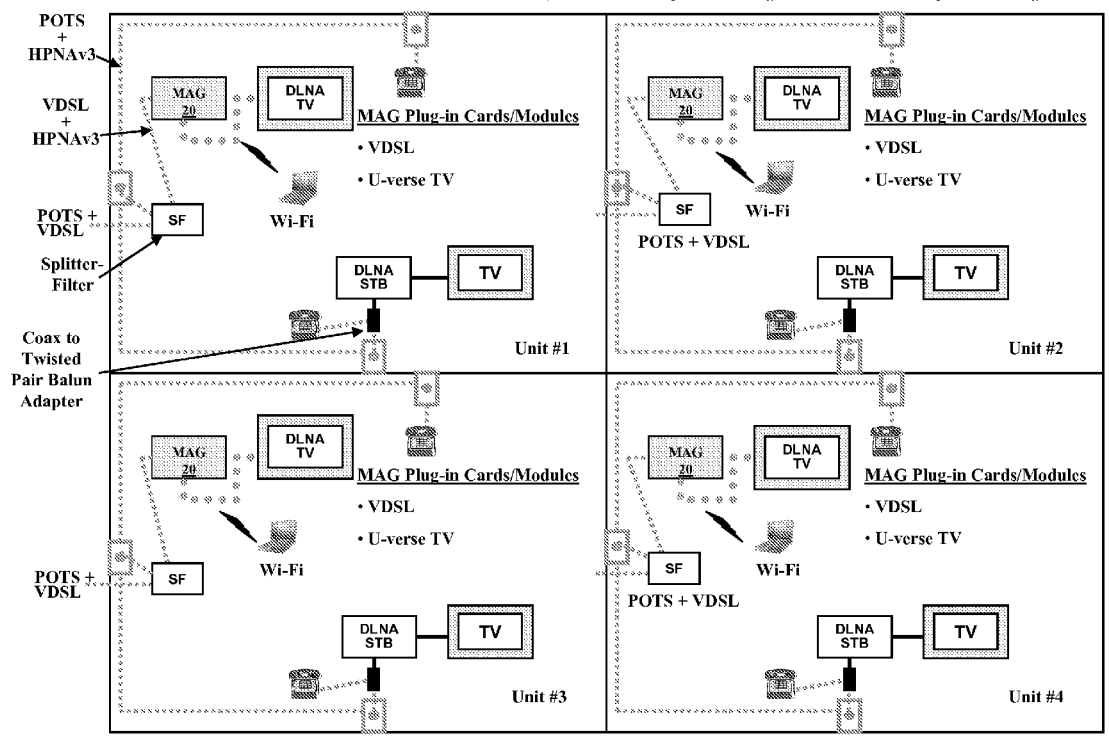

FIGS. 30-37 are schematics illustrating more installations, according to more exemplary embodiments. FIGS. 30-33 illustrate installations in single family units, while FIGS. 34-37 illustrate installations in multiple density or multiple family units. Here, though, these installations utilize Very High Bit-rate Digital Subscriber Line (VDSL) technology. As FIG. 30 illustrates, a VDSL input 620 is received at a splitter-filter-balun 622, and a new coaxial cable installation line 624 feeds the diplexer 612. The multimedia applications gateway 20 receives VDSL and HNPAv3-compliant signals from the diplexer 612, while the existing coaxial cable system 614 receives the HNPAv3-compliant signals from the diplexer 612. The splitter-filter-balun 622 also feeds analog telephony signals to the analog telephones 606. Although again not shown for simplicity, the multimedia applications gateway 20 may have multiple plug-in cards for processing the VDSL signals, for processing cable with Voice-over Internet Protocol signals, and for processing the digital broadcasting system signals. FIG. 31 illustrates another VDSL installation in which a Category 5e cable 630 conveys the VDSL signals to a breakout box 632. Telephone wiring 634 then conveys the VDSL signals and the cable with Voice-over Internet Protocol signals to the multimedia applications gateway 20. A cable connection 636 from the multimedia applications gateway 20 feeds the existing coaxial cable system 614. In FIG. 32, the VDSL input 620 feeds the VDSL signals to a network interface device ("NID") 640. The network interface device 640 routes the cable with Voice-over Internet Protocol signals to the analog telephones 606. The network interface device 640 also routes the HNPAv3-compliant signals over the cable connection 636 to the existing coaxial cable system 614. Here the multimedia applications gateway 20 may again have one or multiple plug-in cards, such as for processing the digital broadcasting system signals. FIG. 33 illustrates a structured wiring system that uses Category 5e cabling to deliver voice, data, and video signals. As FIG. 33 illustrates, the multimedia applications gateway 20 may be installed or mounted near a Structured Wiring Cabinet 650. Category 5e cabling conveys the VDSL signals from the network interface device 640 to the multimedia applications gateway 20. In this installation, two Category 5e cables may connect the multimedia applications gateway 20 to the Structured Wiring Cabinet 650. One of these Category 5e cables may convey voice-over Internet Protocol signals for distribution to the one or more analog telephones 606. Another Category 5e cable may convey data signals to an Ethernet switch (not shown for simplicity) located in the Structured Wiring Cabinet 650. Although again not shown for simplicity, the multimedia applications gateway 20 may have multiple plug-in cards for processing the VDSL signals, for processing cable with Voice-over Internet Protocol signals, and for processing the digital broadcasting system signals. FIGS. 34-37 illustrate many of the same components for installations in multiple density or multiple family units.

Exemplary embodiments may be physically embodied on or in a computer-readable medium. These computer-readable media may include CD-ROM, DVD, tape, cassette, floppy disk, memory card, and large-capacity disk (such as IOMEGA®, ZIP®, JAZZ®, and other computer readable memory storage products (IOMEGA®, ZIP®, and JAZZ® are registered trademarks of Iomega Corporation, 1821 W. Iomega Way, Roy, Utah 84067, 801.332.1000, www.iomega.com). These computer-readable media could be distributed to end-subscribers, licensees, and assignees. These types of computer-readable media, and other types not mentioned here but considered within the scope of the exemplary embodiments, comprise processor-executable instructions for monitoring a multimedia applications gateway.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:
1. A method, comprising:
   downloading a home network management application to a multimedia applications gateway operating in a home network;
   receiving a water pressure measurement in a water heater at the home network management application;

receiving a water temperature in the water heater at the home network management application;
receiving a thermostat setting in the water heater at the home network management application;
determining the water pressure drops below a threshold value;
determining a leak in the water heater when a pressure rate of change exceeds a threshold pressure rate value;
increasing the thermostat setting to recover a desired water temperature in the water heater;
determining the water temperature drops below the desired water temperature;
reducing the water pressure to recover the desired water temperature;
detecting an error code indicating an error occurring in the home network;
sending an alert from the multimedia applications gateway to an external network controller that describes a port of a router experiencing the error code occurring in the home network; and
receiving an instruction at the multimedia applications gateway to disable the port of the router.

2. The method according to claim 1, further comprising receiving a query from the external network controller that requests additional information describing the error code.

3. The method according to claim 1, further comprising disabling the port of the router connected to the multimedia applications gateway.

4. The method according to claim 1, further comprising:
comparing a current utility usage reading to an average utility consumption; and
when the current utility usage reading exceeds the average utility consumption by a threshold value, then further comprising sending a utility usage notification describing excessive consumption of a utility service.

5. The method according to claim 1, further comprising converting a proprietary digital copyright of an Internet Protocol television session to an open standards link protection protocol.

6. The method according to claim 5, further comprising:
storing in the local memory a listing of approved devices, each approved device identified by a unique identification number;
receiving a request from a device connected to the home network, the request requesting data representing the Internet Protocol television session, the request comprising the unique identification number associated with the device;
comparing the unique identification number to the listing of approved devices;
when the unique identification number is found in the listing of approved devices, then sending the data representing the Internet Protocol television session from the local memory in the multimedia applications gateway to the requesting device; and
when the unique identification number is not found in the listing of approved devices, then denying the request.

7. The method according to claim 1, further comprising:
downloading and storing a digital video recorder application to local memory in the multimedia applications gateway;
configuring the local memory to store a video stream received from an external network; and
managing copyright access to the video stream by devices connected to the home network.

8. The method according to claim 1, wherein when the water temperature exceeds a maximum permissible value, then further comprising reducing the water pressure to reduce an over-pressure condition.

9. A non-transitory computer readable medium storing processor executable instructions for performing a method, the method comprising:
downloading a home network management application to a multimedia applications gateway operating in a home network;
detecting packet delay occurring in the home network;
sending an alert to an external network controller that describes a port of a router experiencing the packet delay in the home network;
receiving an instruction from the external network controller to disable the port of the router;
receiving a water pressure within a water heater;
receiving a water temperature within the water heater;
receiving a thermostat setting of the water heater;
determining the water pressure drops below a threshold value;
increasing the thermostat setting to recover a desired water temperature;
determining the water temperature drops below the desired water temperature;
reducing the water pressure to recover the desired water temperature;
determining the water temperature exceeds a maximum permissible value;
determining a leak in the water heater when a pressure rate of change exceeds a threshold pressure rate value;
reducing the water pressure to reduce an over-pressure condition; and
reducing the water pressure to reduce an over-pressure condition when the water temperature exceeds a maximum permissible value.

10. The non-transitory computer readable medium according to claim 9, further comprising instructions for receiving a query from the external network controller that requests additional information describing the anomaly.

11. The non-transitory computer readable medium according to claim 9, further comprising instructions for disabling the port of the router connected to the multimedia applications gateway.

12. The non-transitory computer readable medium according to claim 9, further comprising instructions for:
comparing a current utility usage reading to an average utility consumption;
determining the current utility usage reading exceeds the average utility consumption by a threshold value; and
sending a utility usage notification describing excessive consumption of a utility service.

13. The non-transitory computer readable medium according to claim 9, further comprising instructions for converting a proprietary digital copyright of an Internet Protocol television session to an open standards link protection protocol.

14. The non-transitory computer readable medium according to claim 13, further comprising instructions for:
storing in the local memory a listing of approved devices, each approved device identified by a unique identification number;
receiving a request from a device connected to the home network, the request requesting data representing the Internet Protocol television session, the request comprising the unique identification number associated with the device;

comparing the unique identification number to the listing of approved devices;
determining the unique identification number is found in the listing of approved devices;
sending the data representing the Internet Protocol television session from the local memory in the multimedia applications gateway to the requesting device;
determining the unique identification number is not found in the listing of approved devices; and
denying the request.

15. A system, comprising:
a processor executing code stored in memory that causes the processor to:
downloading a home network management application to a multimedia applications gateway operating in a home network;
receiving a water pressure measurement in a water heater at the home network management application;
receiving a water temperature in the water heater at the home network management application;
receiving a thermostat setting in the water heater at the home network management application;
determining the water pressure drops below a threshold value to indicate a leak in the water heater;
increasing the thermostat setting to recover a desired water temperature in the water heater;
determining the water temperature drops below the desired water temperature;
reducing the water pressure to recover the desired water temperature;
detecting an error code indicating an error occurring in the home network;
sending an alert from the multimedia applications gateway to an external network controller that describes a port of a router experiencing the error code occurring in the home network; and
receiving an instruction at the multimedia applications gateway to disable the port of the router.

* * * * *